(12) United States Patent
Verhelle et al.

(10) Patent No.: US 12,541,798 B1
(45) Date of Patent: Feb. 3, 2026

(54) SYSTEMS AND METHODS FOR QUERYING DATA RECORDS OF A REPOSITORY

(71) Applicant: Veeva Systems Inc., Pleasanton, CA (US)

(72) Inventors: Kristyn M. Verhelle, Livonia, MI (US); Kaiwen Zhong, New York, NY (US); Nikhil Vasandani, Toronto (CA)

(73) Assignee: Veeva Systems Inc., Pleasanton, CA (US)

( * ) Notice: Subject to any disclaimer, the term of this patent is extended or adjusted under 35 U.S.C. 154(b) by 24 days.

(21) Appl. No.: 18/524,602

(22) Filed: Nov. 30, 2023

(51) Int. Cl.
*G06Q 40/08* (2012.01)
*G06F 16/215* (2019.01)
*G06F 16/28* (2019.01)

(52) U.S. Cl.
CPC ........... *G06Q 40/08* (2013.01); *G06F 16/215* (2019.01); *G06F 16/285* (2019.01)

(58) Field of Classification Search
CPC ...... G06Q 40/08; G06F 16/285; G06F 16/215
USPC ....................................................... 707/692
See application file for complete search history.

(56) References Cited

U.S. PATENT DOCUMENTS

| | | |
|---|---|---|
| 8,595,206 B1 | 11/2013 | Ansari et al. |
| 8,918,385 B1 | 12/2014 | Ansari et al. |
| 10,185,809 B1 | 1/2019 | Zhou et al. |
| 10,231,077 B2 | 3/2019 | Raduchel et al. |
| 10,553,307 B2 | 2/2020 | Connely, IV et al. |
| 10,586,614 B1 | 3/2020 | Cai et al. |
| 10,755,812 B1 | 8/2020 | Cai et al. |
| 10,769,181 B2 | 9/2020 | Bari et al. |
| 10,937,531 B1 | 3/2021 | Wang et al. |
| 11,107,578 B2 | 8/2021 | Nag |
| 11,551,794 B1 | 1/2023 | Lofgren et al. |
| 11,575,673 B2 | 2/2023 | Padmani et al. |
| 11,783,922 B1 | 10/2023 | Tong et al. |
| 11,868,506 B2 | 1/2024 | Johnson et al. |
| 11,948,112 B2 | 4/2024 | Crooks et al. |
| 11,989,326 B2 | 5/2024 | Levy et al. |
| 12,019,597 B1 * | 6/2024 | George ................. G06F 16/215 |
| 12,094,588 B1 | 9/2024 | Hermey et al. |
| 12,248,526 B1 | 3/2025 | Pushparajah et al. |
| 2002/0111833 A1 | 8/2002 | Dick |
| 2002/0116227 A1 | 8/2002 | Dick |
| 2002/0165736 A1 | 11/2002 | Tolle et al. |

(Continued)

*Primary Examiner* — Cam Linh T Nguyen

(57) ABSTRACT

A method for querying one or more combined data records of a repository including generating a data record request and providing the data record request to one or more covered entity computing systems. The method includes receiving and cleaning the data records. The method includes assigning cleaned data records to a group. The method includes generating an attribute based on the cleaned data records of the group and adding the attribute to the cleaned data records of the group to generate multiple combined data records. The method includes storing the combined data records in the repository. The method includes receiving a query including a configuration property and executing the query on the data repository to select each combined data record from the data repository which matches the configuration property of the query. The method includes generating an electronic file including the selected combined data records and outputting the electronic file.

20 Claims, 4 Drawing Sheets

(56) References Cited

U.S. PATENT DOCUMENTS

| | | |
|---|---|---|
| 2008/0300902 A1 | 12/2008 | Smith et al. |
| 2008/0306872 A1 | 12/2008 | Felsher |
| 2009/0048877 A1 | 2/2009 | Binns et al. |
| 2010/0131284 A1 | 5/2010 | Duffy |
| 2010/0241595 A1 | 9/2010 | Felsher |
| 2010/0324936 A1 | 12/2010 | Vishnubhatla et al. |
| 2011/0112862 A1 | 5/2011 | Yu |
| 2011/0112970 A1 | 5/2011 | Yu |
| 2011/0119088 A1 | 5/2011 | Gunn |
| 2011/0191343 A1 | 8/2011 | Heaton et al. |
| 2012/0046972 A1* | 2/2012 | Tonti .................. G16H 40/67 705/3 |
| 2012/0191749 A1 | 7/2012 | New et al. |
| 2013/0073313 A1 | 3/2013 | Christakis et al. |
| 2013/0291060 A1* | 10/2013 | Moore ................ G06F 21/6254 726/1 |
| 2014/0129256 A1 | 5/2014 | Veren |
| 2014/0136237 A1 | 5/2014 | Anderson et al. |
| 2014/0298030 A1 | 10/2014 | Akiyama et al. |
| 2015/0046192 A1 | 2/2015 | Raduchel |
| 2015/0112979 A1 | 4/2015 | Vittorio |
| 2015/0347599 A1 | 12/2015 | McMains et al. |
| 2016/0004820 A1* | 1/2016 | Moore .................. G16H 15/00 705/3 |
| 2016/0147945 A1 | 5/2016 | MacCarthy et al. |
| 2016/0210427 A1 | 7/2016 | Mynhier et al. |
| 2016/0358295 A1 | 12/2016 | Heffley et al. |
| 2017/0004266 A1 | 1/2017 | Vanderhoef |
| 2017/0161439 A1 | 6/2017 | Raduchel et al. |
| 2018/0121614 A1 | 5/2018 | Connely, IV et al. |
| 2018/0294048 A1 | 10/2018 | Blumenthal et al. |
| 2018/0322946 A1 | 11/2018 | Ika et al. |
| 2019/0156927 A1* | 5/2019 | Virkar .................. G16H 15/00 |
| 2019/0252049 A1 | 8/2019 | Fotsch et al. |
| 2019/0304578 A1 | 10/2019 | Kain et al. |
| 2020/0005900 A1 | 1/2020 | Cha et al. |
| 2020/0035341 A1 | 1/2020 | Kain et al. |
| 2020/0050949 A1* | 2/2020 | Sundararaman ...... G06F 40/284 |
| 2020/0065410 A1* | 2/2020 | Craig .................... G06F 16/27 |
| 2020/0202040 A1 | 6/2020 | Johnson et al. |
| 2020/0234826 A1 | 7/2020 | Said |
| 2020/0294642 A1* | 9/2020 | Bostic .................. G16H 50/20 |
| 2021/0019296 A1 | 1/2021 | Petersen et al. |
| 2022/0117692 A1 | 4/2022 | Sellberg et al. |
| 2022/0270129 A1 | 8/2022 | Dakic et al. |
| 2022/0270729 A1 | 8/2022 | Saliman et al. |
| 2022/0319643 A1 | 10/2022 | Skees et al. |
| 2022/0319697 A1 | 10/2022 | Morris et al. |
| 2023/0104655 A1 | 4/2023 | Amarasingham et al. |
| 2023/0110360 A1 | 4/2023 | Sanae et al. |
| 2023/0144503 A1 | 5/2023 | Powers et al. |
| 2023/0148326 A1 | 5/2023 | Papel et al. |
| 2023/0206329 A1* | 6/2023 | Cella .................. G06Q 20/0855 |
| 2023/0273848 A1 | 8/2023 | Vera-Ciro et al. |
| 2023/0282322 A1 | 9/2023 | Rajkumar et al. |
| 2023/0368878 A1 | 11/2023 | Molenda |
| 2023/0385450 A1 | 11/2023 | Bessette et al. |
| 2024/0013899 A1 | 1/2024 | Youngblood et al. |
| 2024/0105289 A1 | 3/2024 | Khan et al. |
| 2024/0112767 A1* | 4/2024 | Thomas, III ........... G16H 10/60 |
| 2024/0112771 A1 | 4/2024 | Shelton, IV et al. |
| 2024/0127932 A1 | 4/2024 | Bongiovanni et al. |
| 2025/0006352 A1 | 1/2025 | Schoenberg |
| 2025/0046065 A1* | 2/2025 | Goel .................. G06V 10/761 |
| 2025/0132043 A1 | 4/2025 | Ouimet |
| 2025/0166762 A1 | 5/2025 | Barkol et al. |
| 2025/0190621 A1 | 6/2025 | Boominathan et al. |

* cited by examiner

SYSTEMS AND METHODS FOR QUERYING DATA RECORDS OF A REPOSITORY

TECHNICAL FIELD

The present disclosure relates to systems and methods for querying data records of a repository.

BACKGROUND

Researchers, scientists, industry players, academics, government regulators, and other stakeholders are increasingly in need of ways to quickly group and query health data records.

SUMMARY

One embodiment relates to a method for querying one or more combined data records of a data repository. The method includes generating a data record request and providing the data record request to one or more covered entity computing systems. The method includes receiving multiple data records from the one or more covered entity computing systems and cleaning the data records. The method further includes assigning at least two of the cleaned data records to a group. The method further includes generating at least one attribute based on one or more of the cleaned data records of the group and adding the at least one attribute to the cleaned data records of the group to generate multiple combined data records. The method further includes storing the combined data records in the data repository of the provider computing system. The method includes receiving a query including a configuration property and executing the query on the data repository to select each combined data record from the data repository which matches the configuration property of the query. The method includes generating an electronic file including the selected combined data records and outputting the electronic file.

Another embodiment relates to a method for querying one or more combined data records of a data repository. The method includes generating a data record request and providing the data record request one or more covered entity computing systems. The method includes receiving multiple data records from the one or more covered entity computing systems including a first data record, a second data record, a third data record, and a fourth data record and cleaning the data records. The method further includes assigning at least the cleaned first data record and the cleaned second data record to a first group. The method further includes assigning at least the cleaned third data record and the cleaned fourth data record to a second group. The method further includes generating at least one first attribute based on one or more of the cleaned data records of the first group and adding the at least one first attribute to the cleaned data records of the first group to generate first multiple combined data records. The method further includes generating at least one second attribute based on one or more of the cleaned data records of the second group and adding the at least one first second to the cleaned data records of the second group to generate second multiple combined data records. The method further includes storing the first and second combined data records in the data repository of the provider computing system. The method includes receiving a query and executing the query on the data repository to select at least one combined data record of the first combined data records and at least one combined data record of the second combined data records. The method includes generating an electronic file including the selected combined data records and outputting the electronic file.

This summary is illustrative only and is not intended to be in any way limiting. Other aspects, inventive features, and advantages of the devices or processes described herein will become apparent in the detailed description set forth herein, taken in conjunction with the accompanying figures, wherein like reference numerals refer to like elements.

DETAILED DESCRIPTION

Figure 1:
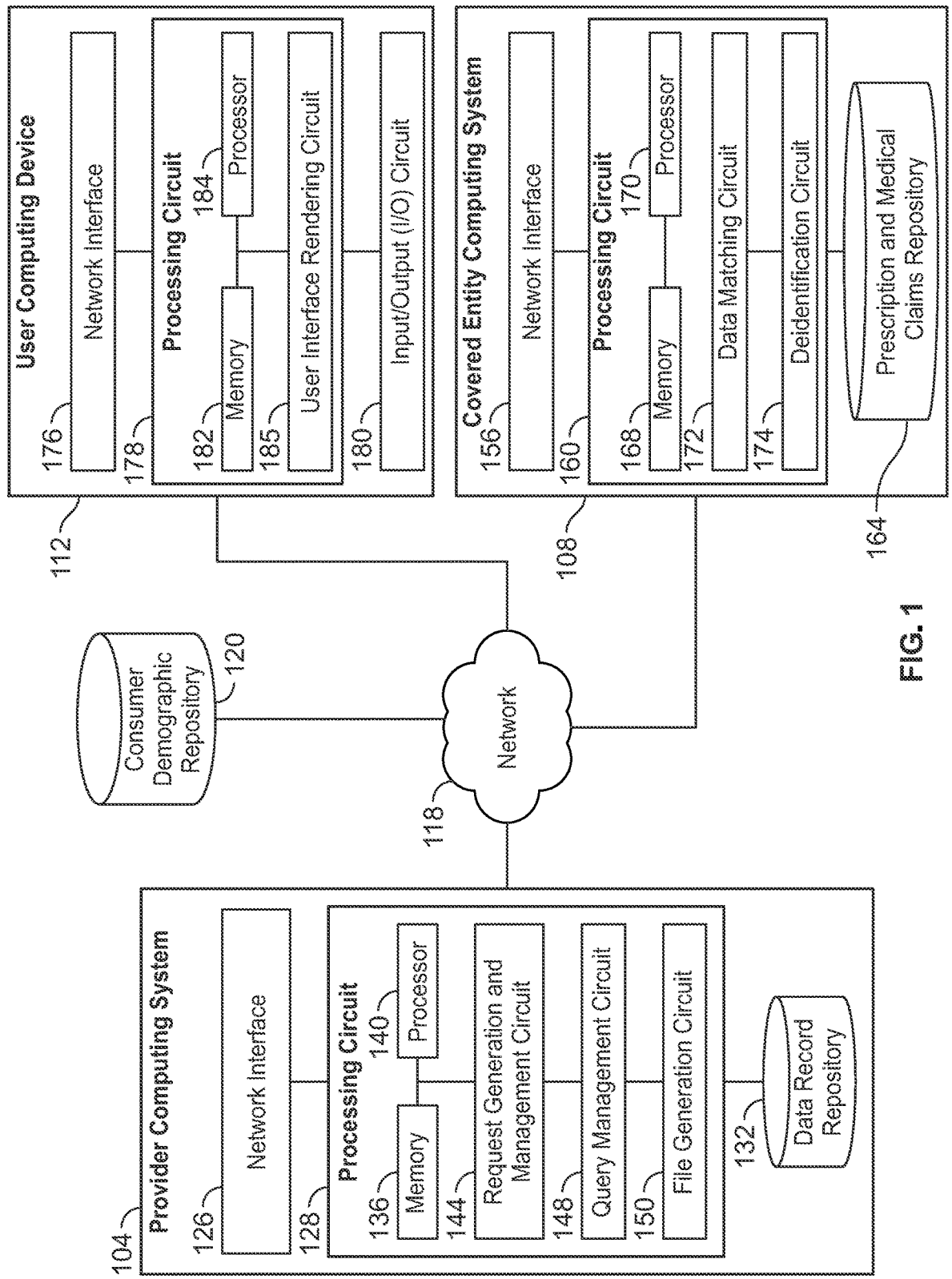
FIG. 1 is a component diagram of a data record query management system, according to an example embodiment.

Referring generally to the figures, systems and methods for querying data records of a repository are disclosed. The systems and methods described herein provide for improved grouping or sorting of data records by generating a unique intermediate group identifier for each data record based on the fields or data included in the data record. For instance, the systems and methods described herein provide for an improvement over typical sorting or grouping systems because the present systems and methods do not have to manually sort or group each of the data records by finding matching characteristics, as may be done in typical grouping systems. Instead, the present systems and methods generate an intermediary group identifier which is inherently shared uniquely among data records of the group based on the data included in the data record such as a date of the data record, a medical product identifier of the data record, a health care provider identifier of the data record, and the like. The systems and methods described herein may then hash or transform the intermediary group identifier to generate a group identifier. In comparison, typical computerized sorting systems may select a first data record and then find a second data record with matching data or characteristics by checking each data record of the received data records. This can be slow and computationally expensive such that hundreds of sorting algorithms have been developed to speed up this process and lower computational costs. By contrast, the present systems and methods generate an intermediary group identifier and then hash the intermediary group identifier to generate the group identifier. The present systems and methods may then store the data records in relation to the group identifier such that the data records of the same group are automatically stored together and do not have to be sorted via a computationally expensive algorithm. For instance, to return data records of a specific group, the present systems and methods may query or search a data repository for data records that have a specific group number (e.g., 1234321). In this regard, the data records are automatically grouped or sorted together through generation of the group identifier, which uses less processing power and memory by not having to utilize a sorting algorithm. For instance, sorting algorithms can be computationally expensive, especially when dealing with large datasets. By avoiding a sorting algorithm, the present systems and methods significantly reduce the processing time and resource usage required for data record grouping. Likewise, sorting algorithms typically involve rearranging data in memory, which can increase cache misses and reduce data locality. By avoiding a sorting algorithm, the present systems and methods provide for improved data locality, leading to faster data access and overall performance gain.

Additionally, by hashing the intermediary group numbers using a hashing algorithm (e.g., SHA-256), the present systems and methods provide for secure grouping of the data records while generating a consistent group or event identifier (e.g., a 256-bit value) that is the same for data records of the same group. For instance, by using SHA-256 to hash the intermediary group identifier, the present systems and methods provide for improved security on the intermediary group identifier such that it is computationally infeasible to determine the intermediary group identifier based on the group identifier, while still producing a consistent and unique group identifier for each intermediary group identifier. In this regard, the present systems and methods provide for improved data security which leads to increased system uptime (compared to traditional querying systems). For instance, when data is more secure, systems are less likely to be disrupted by cyberattacks which provides for increased uptime and improved productivity by the present systems and methods.

The systems and methods described herein further provide for improved structuring and generation of electronic files. For example, because the electronic file is dynamically structured and includes combined data records, as decided by a user building a customizable query, the electronic file does not include excess or unwanted values and therefore requires less memory to be stored and less processing power to be shared between computing devices and systems. For example, if the electronic file were generated as a statically structured file (e.g., included the same data records every time) and still included all the values, insights, and data described herein, the electronic file would include excess data that was unwanted by the user or the computing device/system to which the electronic file is provided. The excess data would make the electronic file larger, thereby requiring additional memory to store the electronic file and additional processing power to generate and share the electronic file. In comparison, because the systems and methods described herein dynamically structure the electronic file through use of a customizable query, as decided by the user and/or the device/system to which the electronic file is provided, the electronic file includes only requested data, reducing the memory required by the provider computing system to store the electronic file and processing power required by the provider computing system to generate and share the electronic file.

Likewise, because the electronic file is dynamically generated as a specified file type, as decided by the user or the computing device/system to which the electronic file is provided, the systems and methods described herein may provide for improved shareability of the electronic file as well as use less processing power and memory. For example, in situations where the electronic file is only generated as a static file type, third-party computing systems and recipient computing devices (e.g., the recipient computing device) may have to perform additional file modification and conversion or request the provider computing system to do so, which requires additional processing power, memory (to keep two files), and time. In comparison, the systems and methods described herein allow the user to specify the file type of the electronic file through the electronic file generation request. Accordingly, the user can specify the wanted file type the first time and the provider computing system will generate the electronic file as the specified file type. As a result, no additional file modification or conversion is required, reducing processing power usage, memory usage, and overall processing time for the provider computing system.

As used herein, "data records" or "health data records" can include data related to a patient's medical history such as symptoms, diagnosis data (e.g., an ICD-10 diagnosis code), procedures, medical claims (Mx) data, clinical data, electronic health record (EHR) data (including Rx data, lab tests/vitals, and the like), prescription claims (Rx) data associated with one or more medical products (e.g., including transaction data, prescribing HCP national prescriber identifier (NPI), medical product data, date/time data, diagnosis data, and the like), medical claims (Mx) data associated with national health insurance (e.g., Medicare or Medicaid) claims data associated with one or more medical products (e.g., including transaction data, prescribing HCP national prescriber identifier (NPI), and medical outcomes. Further, "data records" or "health data records" can include private health data (PHI) such as a patient's name, address, IP address, contact data, and the like.

As used herein, "patient data" or "consumer data" can include patient (identified or deidentified) identification data (e.g., name, address, email, zip code, regional location data (e.g., West Coast, Midwest), etc.), patient demographic data (e.g., ethnicity, gender, age, and the like), payment type(s) used by the patient (e.g., insurance, Medicare, Medicaid, individual payer, credit card, cash, etc.), average income in patients zip code (e.g., publicly available income data by zip code combined with the patients zip code), job type or name, education level, allergy data, fitness equipment data (e.g., owns a treadmill, owns weights, etc.), activity data (e.g., travel, outdoors activities, electronics, pets), average education in patients zip code, and other data described herein as being associated or related to a patient.

Additionally, as used herein the terms "information" and "data" may be used interchangeably such that one may be substituted for the other and vice versa.

Referring now to FIG. 1, a system 100 for managing and querying combined data records is shown, according to an example embodiment. The system 100 includes a provider computing system 104, a covered entity computing system 108, a user computing device 112, and a consumer demographic repository 120, connected by a secure network (e.g., a network 118).

The network 118 communicably and operably couples the provider computing system 104, the covered entity computing system 108, and the user computing device 112 such that communicable and operable computing may be provided between the provider computing system 104, the covered entity computing system 108, and the user computing device 112 over the network 118. In some embodiments, the network 118 further communicably and operably couples the consumer demographic repository 120 to the provider computing system 104, the covered entity computing system 108, and the user computing device 112. In various embodiments, the network 118 includes any combination of a local area network (LAN), an intranet, the Internet, or any other suitable communications network, directly or through another interface.

The provider computing system 104 may be operated and managed by a provider (e.g., a software as a service (SaaS) provider, a cloud services provider, a software provider, a service provider, etc.) and may include a computer system (e.g., one or more servers (e.g., a cloud computing server) each with one or more processing circuits). In some embodiments, the provider computing system 104 may act as a host and provide an application (e.g., a web-based application, a mobile application, etc.) to the user computing device 112 over the network 118 in response to authenticating the user computing device 112. In some examples, the provider computing system 104 may be a multi-tenant system where various elements of hardware and software may be shared by one or more customers. In a multi-tenant system, a user is typically associated with a particular customer. In one example, a user (e.g., of the user computing device 112) could be an employee of one of a number of (pharmaceutical) companies which are tenants, or customers, of the provider computing system 104.

In some embodiments, the provider computing system 104 may run on a cloud computing platform. Users can access content on the cloud independently by using a virtual machine image or purchasing access to a service maintained by a cloud repository provider.

In some embodiments, the provider computing system 104 may be provided as Software as a Service ("SaaS") to allow users to access the provider computing system 104 with a thin client.

As shown, the provider computing system 104 may include a network interface 126, a processing circuit 128, and a data record repository 132. In some embodiments, the provider computing system 104 may include an input/output circuit (e.g., similar to (e.g., the same as) an input/output circuit 180 as will described further herein).

The network interface 126 is structured to establish connections with the covered entity computing system 108, the user computing device 112, and the consumer demographic repository 120 by way of the network 118. The network interface 126 includes program logic and/or hardware-based components that connect the provider computing system 104 to the network 118. For example, the network interface 126 may include any combination of a wireless network transceiver (e.g., a cellular modem, a broadband modem, a Bluetooth transceiver, a Wi-Fi transceiver, a Li-Fi transceiver, etc.) and/or a wired network transceiver (e.g., an Ethernet transceiver). In some embodiments, the network interface 126 includes the hardware and machine-readable media structured to support communication over multiple channels of data communication (e.g., wireless, Bluetooth, near-field communication (NFC). In some embodiments, the network interface 126 includes cryptography logic and capabilities to establish a secure communications session.

The processing circuit 128, as shown, comprises a memory 136, a processor 140, a request generation and management circuit 144, a query management circuit 148, and a file generation circuit 150. The memory 136 includes one or more memory devices (e.g., RAM, NVRAM, ROM, flash memory, hard disk storage, etc.) that store data and/or computer code for facilitating the various processes described herein. That is, in operation and use, the memory 136 stores at least portions of instructions and data for execution by the processor 140 to control the processing circuit 128. The memory 136 may be or include tangible, non-transient volatile memory and/or non-volatile memory. The processor 140 may be implemented as a general-purpose processor, an application specific integrated circuit (ASIC), one or more field programmable gate array (FPGAs), a digital signal processor (DSP), a group of processing components or other suitable electronic processing components.

As described herein, the request generation and management circuit 144 is configured and/or structured to generate and manage data record requests that may be provided to the covered entity computing system 108. For instance, the request generation and management circuit 144 may be configured or structured to retrieve data included in the data record request (e.g., a timeframe for which data records are sought), consumer data (e.g., from the consumer demographic repository 120) for which matching or associated data records are sought, Health Care Provider (HCP) data (e.g., from an HCP repository (not shown)) for which matching or associated data records are sought, government health data from a national health repository (not shown)) for which matching or associated data records are sought, medical product data for which matching or associated data records are sought (e.g., from a medical domain repository (not shown)), or any combination thereof. Further, the request generation and management circuit 144 may be configured or structured to generate the data record request including the data included in the request and provide the data record request to the covered entity computing system 108. In some embodiments, the request generation and management circuit 144 may be configured to generate and provide the data record request to the covered entity computing system 108 at specific time intervals (e.g., every hour, every day, every week, every month, etc.), and, as a result, the provider computing system 104 may receive the data records at the specific time intervals. By doing so, the provider computing system 104 may act as a centralized source of reliable, up to date, data records (e.g., health data records). For instance, because the request generation circuit 144 may generate and provide the data record request to the covered entity computing system 108 at specific time intervals, the provider computing system 104 may receive updated data records at the specific time intervals and continuously keep up-to-date data records.

In some embodiments, the request generation and management circuit 144 is further configured and/or structured to receive a file generation request. The file generation request may identify one or more statistical values and a recipient address (e.g., an IP address, an email address, an FTP address, etc.). In other embodiments, the one or more statistical values and the recipient address may be received within or accompanying the query by the query management circuit 148.

In some embodiments, the request generation and management circuit 144 is further configured and/or structured to receive the requested data records from the covered entity computing system(s) 108 and store the data records in the data record repository 132. In other embodiments, other circuits of the processing circuit 128 (e.g., the user-defined query management circuit 148, etc.) are configured or structured to receive the requested data records from the covered entity computing system(s) 108 and store the data records in the data record repository 132.

In some embodiments, the request generation and management circuit 144 is further configured and/or structured to clean the received data records and determine and generate multiple attributes of the data records to augment or add to the data records. For instance, the request generation and management circuit 144 may clean the data records by deduplicating data records that appear multiple times (e.g., removing or combining multiple duplicate records into a single data record). In other examples, the request generation and management circuit 144 may determine and/or generate a reject code classification associated with at least one of the data records and add the reject code classification to the at least one data record, as will be described further herein. In other embodiments, a data record and attribute management circuit (not shown) of the processing circuit 128 may clean, group, and add attributes to the data records.

As described herein, the data record request may include data for which matching data records (e.g., health data records) are sought. In one example, the data record request may include a list of specific IP addresses that watched an online advertisement. The covered entity computing system 108 may receive the data record request, match data records of patients having an IP address within the list and return the data records to the provider computing system 104. In another example, the data record request may include consumer data (e.g., consumer name, consumer demographic data (e.g., age, date of birth, zip code, etc.)). Then, in response to receiving the data record request, the covered entity computing system 108 may match data records of patients with the consumer data (e.g., based on name). Further, prior to returning the matching data records, the covered entity computing system 108 may de-identify (e.g., hash, tokenize, encrypt, etc.) the PHI included in the data record. In this way, the PHI of the patient is protected, and the patient's privacy is maintained. In another example, the data record request may include HCP data (e.g., HCP name, national provider identifier (NPI), HCP zip code, place of employment, etc.). Then, in response to receiving the data record request, the covered entity computing system 108 may match data record for which the HCP was associated (e.g., based on the NPI of the HCP).

The query management circuit 148 is configured and/or structured to receive a query (also referred to as a customizable or mutable query) from the user computing device 112 and execute the query on the data record repository 132 to select one or more of the data records stored therein. For example, the provider computing system 104 may receive a customizable query that includes multiple configuration properties (also referred to as query parameters) (e.g., a first configuration property and a second configuration property) from the user computing device 112. The first configuration property may identify a specific medical product (e.g., Drug X), and the second configuration property may identify a specific date range (e.g., Jan. 1, 2021-Jan. 1, 2022). In response, the query management circuit 148 may execute the query on the data record repository 132 by selecting or receiving data records that are associated with the medical product (e.g., a prescription for Vaccine Y, EHR indicating a patient received Drug X, etc.) and between the specific date range from the data record repository 132.

As described herein, each configuration property may be a property or query parameter through which the provider computing system 104 selects, filters, and refines the (aggregate) data records of the data record repository 132. For instance, a first configuration property may identify or include a medical product (e.g., Drug x) for which data records (e.g., health data records) and/or patient's (who received a prescription for Drug X) data records are sought. In another example, a second configuration property may identify or include a diagnosis code (e.g., code 123) for which data records (e.g., health data records) and/or patients (who received a diagnosis of diagnosis code 123) data records are sought. Other configuration properties will be described further, but may include procedures (e.g., procedure codes), generated or determine attributes (e.g., transaction status or state (e.g., rejected, dispensed, reversed), rejection code classification, a disposition or order of the data record (e.g., interim record, final record, etc.), etc.), timeframes, demographic features (e.g., gender, age range or age, etc.), location (e.g., zip code, state, country, county, etc.), payment type (e.g., private insurance, national health insurance (e.g., Medicare, Medicaid, Medicare part A-D, etc.)), activity or number of occurrences (e.g., a minimum of 5 prescriptions, a prescription at least once a year, a prescription at least once a quarter, maximum of 10 prescriptions, etc.), prescribing HCP specialty (e.g., Pediatrician, Cardiologist, etc.), and/or a sequence of one or more configuration properties (e.g., a diagnosis of diagnosis code 123 before (i.e., at an earlier date) than a prescription of Drug X, a prescription of Drug X before a procedure for procedure code 123, etc.).

In some embodiments, the query management circuit 148 is further configured or structured to modify, filter, and/or aggregate the selected or received data records based on the query. For instance, using the example above, the query may include a third configuration property. The third configuration property may identify an aggregation type as based on patients. In response, the query management circuit 148 may aggregate data records based on or into each specific patient. For instance, the query management circuit 148 may take each data records that is associated with a specific patient and organize it such that trends and inferences can be made. In one example, the aggregated data may indicate a specific patient have received Drug X on Jan. 6, 2021, and on Jul. 7, 2021. As will be described further herein, the query management circuit 148 may aggregate the data records based on other aggregation types (e.g., HCP, location, country, patient, etc.). In other embodiments, the data records that are received from the covered entity computing system(s) 108 may already be aggregated.

In some examples, the query may include a first configuration property, a second configuration property, and an operator (e.g., a logical operator (AND, OR, XOR, etc.), a comparison operator (e.g., <, >, =, !=, etc.), grouping operators (e.g., "( )" "[ ]", etc.), NOT, etc.) comparing the first configuration property and the second configuration property. For instance, the first configuration property may identify a specific medical product, and the second configuration property may identify a specific diagnosis code. Further, the operator may be the logical operator "OR", indicating that the data records are to include the specific diagnosis code or the specific medical product. In response, the query management circuit 148 may execute the query by selecting each data record that is associated with the specific diagnosis code and then selecting each data record that is associated with the specific medical product. In some embodiments, the query management circuit 148 may then deduplicate or remove duplicate data records from the selected data records.

In other examples, the query may include a query type (also referred to as a filter criteria). For instance, the query may include a first configuration property, a second configuration property, the aggregation type "patient", and the logical operator "AND". Further, the query may include the filtering criteria "exact match", indicating that the data records are to be filtered, by the query management circuit 148, to only include records, aggregated by patient, that exactly match the first configuration property and the second configuration property. In another example, the query may include the filtering criteria "partial match", indicating that data records are to be selected for patients who meet the first configuration property (e.g., received a medical prescription for Drug X) and the second configuration property (e.g., received a diagnosis for condition Y) from the data record repository 132 by the user-defined query management circuit 148. Then, based on the filtering criteria, the selected portion of the health data is to be filtered, by the query management circuit 148, to only include records that match the first configuration property and the second configuration property.

In another example, the query may indicate one or more statistical values (e.g., median quantity of a medical product, likelihood or percentage of times switched from the medical product, percentage of generic medical products versus name brand medical products, total number of prescriptions (TRx), etc.) associated with the aggregation type that are to be calculated as well. In response, the user-defined query management circuit 148 may determine the values based on the data records. In other embodiments, other circuits (e.g., the file generation circuit 150) of the provider computing system 104 may determine the statistical values.

The file generation circuit 150 is configured and/or structured to generate an electronic file based on the file generation request or the query. For instance, once the query management circuit 148 has executed the customizable query and selected the matching data records (and aggregated the portion of the health data), the file generation circuit 150 may generate a file of a specified format (e.g., comma-separated value (CSV) format, Excel (XLS) format, etc.) and populate it with the matching data records. Because the electronic file is generated as a specified file format, the electronic file can be shared with a variety of destinations and quickly parsed and analyzed. In some embodiments, the file generation request may indicate the specified file format that the electronic file is to be.

The data record repository 132 is a repository (e.g., a database, cloud storage, etc.) that is structured or configured to receive, store, and manage data records (e.g., health data records) received from the one or more covered entity computing systems 108. For example, the data record repository 132 may receive Rx data, Mx data, EHR, government health record data, and the like from the one or more covered entity computing systems 108. Each health data record may be associated with a specific medical product(s) (e.g., drug name, one or more substances included in the medical product, trade name, use cases, diagnosis code(s)), deidentified PHI (e.g., tokenized PHI), demographic data (e.g., age range, payer type, zip code, 3-digit zip code, etc.), and/or an HCP (e.g., NPI of the HCP). In some embodiments, the data records may be aggregated by a specific aggregation type (e.g., patient, HCP, location, etc.). Further, the data record repository 132 can be structured according to various database types, such as, relational, hierarchical, network, flat, point-in time, and/or object relational. In some embodiments, the data record repository 132 includes a plurality of nonvolatile/non-transitory storage media such as solid-state storage media, hard disk storage media, virtual storage media, cloud-based storage drives, storage servers, and/or the like. In some embodiments, the provider computing system 104 may include a separate repository for each type of health data records (e.g., a prescription claims repository (not shown) for Rx data, a medical claims repository (not shown) for Mx data, an electronic health record repository (not shown) for EHR, a government health data repository (not shown) for government health data), etc.).

In some embodiments, the provider computing system 104 further includes a medical domain repository (not shown) that receives, stores, and manages various medical domain data (e.g., medical product data, procedure data (e.g., procedure codes and descriptions), and diagnosis data (e.g., diagnosis codes and descriptions)). While not shown, the medical domain repository may be structured similar to the data record repository 132. In one instance, the medical domain repository may receive a grouping of multiple drugs or medical products as specified by the user of the user computing device 112. As will be described herein, the grouping of drugs may be utilized by the user in generating the customizable query.

Still referring to FIG. 1, the one or more covered entity computing systems 108 may each include a computer system (e.g., one or more servers each with one or more processing circuits) and be operated by, be managed by, and/or operate on a data network of a "covered entity" as defined by the Health Insurance Portability and Accountability Act of 1996 (HIPAA) (or other laws that protect health data). For example, the covered entity may be a pharmacy chain (e.g., a pharmacy company) with access to prescription claims data, a medical claims company (e.g., a medical insurance company) with access to medical claims data, a medical provider with access to EHR data, or a government entity with access to national health insurance (e.g., Medicare or Medicaid) claims data, and the like. In this regard, the covered entity computing system 108 may have direct access to health data records including PHI, prescription data, diagnosis data, and other health data associated with one or more patients. As shown, the covered entity computing system 108 may include a network interface 156, a processing circuit 160, and a prescription and medical claims repository 164. In some embodiments, the covered entity computing system 108 may include an input/output circuit (e.g., similar to the input/output circuit 180).

The network interface 156 is structured to establish connections with the provider computing system 104 and the consumer demographic repository 120 by way of the network 118. The network interface 156 includes program logic and/or hardware-based components that connect the covered entity computing system 108 to the network 118. For example, the network interface 156 may include any combination of a wireless network transceiver (e.g., a cellular modem, a broadband modem, a Bluetooth transceiver, a Wi-Fi transceiver, a Li-Fi transceiver, etc.) and/or a wired network transceiver (e.g., an Ethernet transceiver). In some embodiments, the network interface 156 includes the hardware and machine-readable media structured to support communication over multiple channels of data communication (e.g., wireless, Bluetooth, near-field communication (NFC). In some embodiments, the network interface 156 includes cryptography logic and capabilities to establish a secure communications session.

The processing circuit 160, as shown, comprises a memory 168, a processor 170, a data matching circuit 172, and a deidentification circuit 174. The memory 168 includes one or more memory devices (e.g., RAM, NVRAM, ROM, flash memory, hard disk storage, etc.) that store data and/or computer code for facilitating the various processes described herein. That is, in operation and use, the memory 168 stores at least portions of instructions and data for execution by the processor 170 to control the processing circuit 160. The memory 168 may be or include tangible, non-transient volatile memory and/or non-volatile memory. The processor 170 may be implemented as a general-purpose processor, an application specific integrated circuit (ASIC), one or more field programmable gate array (FPGAs), a digital signal processor (DSP), a group of processing components or other suitable electronic processing components.

The data matching circuit 172 is structured and/or configured to receive the data record requests from the provider computing system 104 including any additional data for which matching data records are sought (e.g., consumer data, HCP data, etc.) and determine the matching data records. For instance, the data matching circuit 172 may receive a data record request including medical product data (e.g., a list of medical products) for which matching data records are sought. The data matching circuit 172 may then search or query the prescription and medical claims repository 164 for data records that is associated with one or more of the medical products of the medical product data. For example, the data matching circuit 172 may search and return a data record (e.g., an Rx transaction) which is associated with a medical product of the medical product data. In another example, the data matching circuit 172 may search and return data records that matched with consumer data (e.g., demographic data), which may be matched based on identifying data of the data records and the consumer data.

In some embodiments, the covered entity computing system 108 (and more particularly the data matching circuit 172) is structured to aggregate various pieces of internal and external data (e.g., prescription claim (Rx) data, medical claim (Mx) data, media exposure data, HCP data, patient demographics, and the like) based on aggregation type (as described with regard to the query management circuit 148 of the provider computing system 104).

The deidentification circuit 174 is structured to receive the matched data records and deidentify any identifying data (e.g., PHI) included within the matched health data and corresponding data (e.g., consumer data). To deidentify the identifying data of the matched health data, the deidentification circuit 174 may first determine any identifying data included in the matched data records and then perform one or more operations to remove the associated patient's identity or related private data. In some embodiments, the deidentification circuit 174 may deidentify identifying data of the data records by encrypting the identifying data, tokenizing the identifying data, or by performing some other data masking function.

In other embodiments, the deidentification circuit 174 may deidentify identifying data (e.g., PHI) of the data records by performing a hash function on the identifying data. For example, the deidentification circuit 174 may perform a hash function on the private health data that removes the identity or private data of the patient and returns a hash value in place of the identifying data. Example hash functions include, but are not limited to, the mid-square method, string folding, and the like. In some embodiments, all covered entity computing systems 108 from which data records are received by the provider computing system 104 may use the same hash function to provide for consistent hash values across the covered entity computing systems 108. For example, because each covered entity computing system 108 may use the same hash function (i.e., a hash function that returns the same hash value for the same input), the provider computing system 104 may receive data records, with deidentified PHI, from multiple covered entity computing systems 108. For example, the provider computing system 104 may receive health data including Rx data from a pharmacy chain covered entity computing system, data records including Mx data from a medical claims company, data records including clinical data from a medical provider (e.g., a hospital), and government health data records (e.g., Medicare data, Medicaid data, etc.) including national health insurance claims data from a national health insurance provider, each data record including deidentified PHI. Then, the provider computing system 104 may match the various pieces of the received data records based on the deidentified PHI and specifically based on matching hash values. In other embodiments, the provider computing system 104 matches the various pieces of received data records by matching one or more patient demographics or attributes (e.g., same HCP NPI, same date of transaction, same credit card used in both transactions, etc.) to match the data records. In this way, the data integrity and usability of the PHI may be maintained while protecting the patients PHI and identity.

Once the deidentification circuit 174 has deidentified the identifying data of the matching data records, the processing circuit 160 and the network interface 156 may be structured to send the data records, including the deidentified PHI, to the provider computing system 104, in response to the data record request. In some embodiments, the covered entity computing system 108 may receive data record requests at specific time intervals and provide the matched data records to the provider computing system 104 at the same time intervals. In this way, the provider computing system 104 may have up-to-date data records and act as a centralized source of reliable data records.

The prescription and medical claims repository 164 is a repository that receives, stores, and manages various Rx data and/or Mx data associated with the customers or users of the covered entity. To do so, the prescription and medical claims repository 164 can be structured according to various database types, such as, relational, hierarchical, network, flat, point-in time, and/or object relational. In operation, the prescription and medical claims repository 164 is configured to store Rx and/or Mx data. In some embodiments, the prescription and medical claims repository 164 is a health data record repository 164 configured to store health data including PHI, Rx data, medical product data, Mx data, and the like. For example, if the covered entity is a medical claims company, the covered entity computing system may include a medical claims database to store medical claims data. In another example, the covered entity computing system 108 may include a national health insurance claims database or an electronic health record database. In some embodiments, the prescription and medical claims repository 164 is not included in the covered entity computing system 108 but is connected to the covered entity computing system 108 over a covered entity private network or the network 118. In other embodiments, each covered entity computing system 108 may include multiple repositories for each piece of separately stored health data (i.e., a separate repository for Rx data, EHR data, and for Mx data).

Rx data can include transaction data for prescriptions filled by a patient. For example, the Rx data may include medical product data, patient data, PHI, transaction cost/price data, prescribing HCP data, date/time data, and the like. Mx data can include transaction data for medical procedures/treatments filled by a patient. For example, the Mx data may include medical product data, patient data, PHI, transaction cost/price data, prescribing HCP data, date/time data, and the like. EHR data may be similar and include similar data to the Rx and Mx data.

Still referring to FIG. 1, the user computing device 112 can be any type of computing device or computing system. For instance, the user computing device 112 can be one or more of a mobile phone, a tablet computer, a laptop computer, a smart watch, a server computer system, and any other internet-connected device that is capable of running an application. In operation, the user computing device 112 may communicate and interface with the provider computing system 104, the covered entity computing system 108, the media exposure repository 120, or the medical product repository 124. Further, the user computing device may generate and provide electronic requests to determine the impact a privacy-protected media exposure had on prescriptions or NPS for a specific medical product to the provider computing system 104. As shown, the user computing device 112 may include a network interface 176, a processing circuit 178, and the input/output circuit 180.

The network interface 176 is structured to establish connections with the provider computing system 104 and the consumer demographic repository 128 by way of the network 118. The network interface 176 may be similar to the network interface 126 and include program logic and/or hardware-based components that connect the user computing device 112 to the network 118. For example, the network interface 176 may include any combination of a wireless network transceiver (e.g., a cellular modem, a broadband modem, a Bluetooth transceiver, a Wi-Fi transceiver, a Li-Fi transceiver, etc.) and/or a wired network transceiver (e.g., an Ethernet transceiver). In some embodiments, the network interface 176 includes the hardware and machine-readable media structured to support communication over multiple channels of data communication (e.g., wireless, Bluetooth, near-field communication (NFC). In some embodiments, the network interface 176 includes cryptography logic and capabilities to establish a secure communications session.

The processing circuit 178, as shown, may comprise a memory 182, a processor 184, and a user interface generation circuit 185. The memory 182 includes one or more memory devices (e.g., RAM, NVRAM, ROM, flash memory, hard disk storage, etc.) that store data and/or computer code for facilitating the various processes described herein. That is, in operation and use, the memory 182 stores at least portions of instructions and data for execution by the processor 184 to control the processing circuit 178. The memory 182 may be or include tangible, non-transient volatile memory and/or non-volatile memory. The processor 184 may be implemented as a general-purpose processor, an application specific integrated circuit (ASIC), one or more field programmable gate array (FPGAs), a digital signal processor (DSP), a group of processing components or other suitable electronic processing components.

The user interface generation or rendering circuit 185 may be configured to receive a user interface (e.g., a web interface in an HTML file and related files, a downloaded graphical user interface, etc.) from the provider computing system 104 and render the user interface on the user computing device 112 via the I/O circuit 180. In this way, the provider computing system 104 may generate one or more user interfaces and provide the one or more user interfaces to the user interface generation circuit 185 to be rendered on the user computing device 112 (e.g., on a display of the I/O circuit 148 of the user device 112).

The I/O circuit 180 is structured to receive communications from and provide communications to the user of the user computing device 112 (e.g., the user). In this regard, the I/O circuit 180 is structured to exchange data with the processing circuit 178 to provide output to the user and to receive input from the user. As a result, the I/O circuit 180 may include a display that may be manipulated by the application. In some embodiments, the I/O circuit 180 may also include a keyboard, a mouse, a joystick, a touch screen, touch areas, soft keys, a microphone, a speaker, a vibration mechanism, a sensor, a RFID scanner, or other input or output devices described herein.

Still referring to FIG. 1, the consumer demographic repository 120 is a repository that receives, stores, and manages various consumer data associated with multiple consumers. To do so, the consumer demographic repository 120 can be structured according to various repository types, such as, relational, hierarchical, network, flat, point-in time, and/or object relational. In operation, the consumer repository is configured to store consumer data such as IP addresses of consumers who watched a video, demographic data (e.g., consumer's age, consumer's zip code, etc.), and the like. Further, the consumer data within the consumer repository may be used to generate data record requests by the provider computing system 104. In this regard, the provider computing system 104 may generate lists of consumers for which data records are sought, populate the data record request with the list, and provide the data record request to the covered entity computing system 108, which may return deidentified health data of corresponding consumers. In some embodiments, the consumer demographic repository 120 is operated by a third-party and communicates with the provider computing system 104, the covered entity computing system 108, and/or the user computing device 112 over the network 118. For example, the provider computing system 104 may send a consumer data request to the consumer demographic repository 120 including a list of consumers for which consumer data is sought. In response, the consumer demographic repository 120 may provide consumer data to the provider computing system 104. In other embodiments, the provider computing system 104, the covered entity computing system 108, or the user computing device 112 include the consumer repository 120.

Figure 2A:
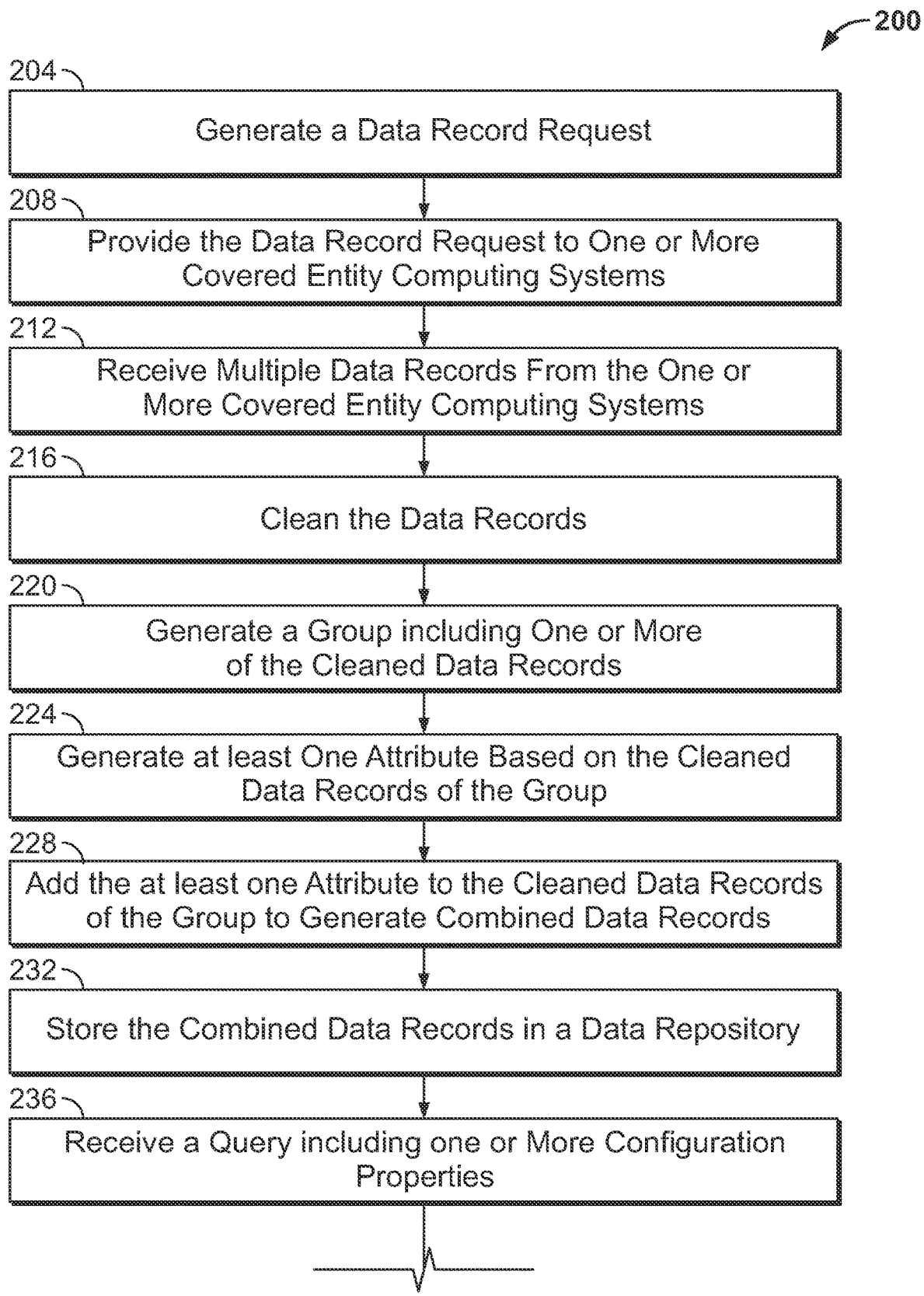
FIGS. 2A-2B are a flow diagram of a method for generating combined data records and querying the combined data records, according to an example embodiment.
Figure 2B:
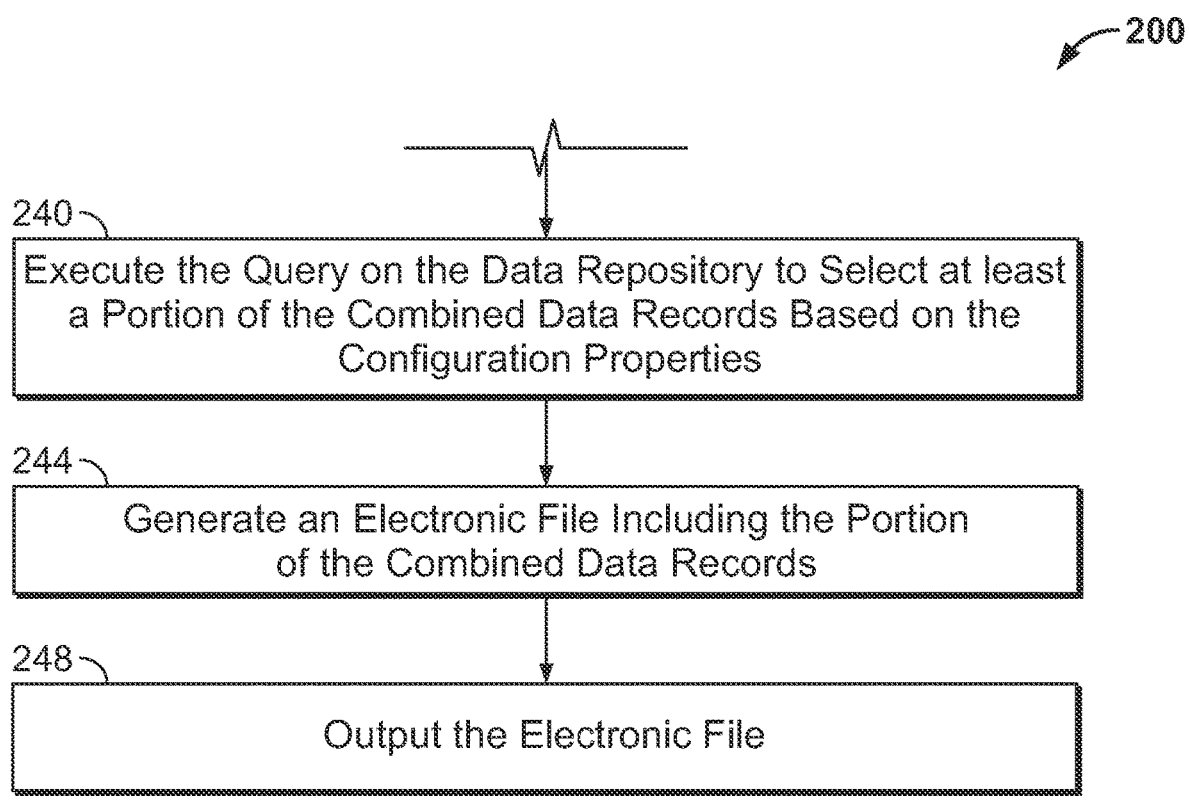

Referring now to FIG. 2, a method 200 of querying combined data records from a repository is shown, according to an example embodiment. Method 200 can be carried out by the system 100 of FIG. 1. More particularly, the method 200 can be carried out by the processing circuit 128 of the provider computing system 104 and through communication with the covered entity computing system 108, and the user computing device 112.

Method 200 commences at step 204 at which the provider computing system 104 generates a data record request. As described herein, the health data request may be generated and populated to include various types of data such as HCP data, consumer data, medical product data, and a timeframe. In some embodiments, the provider computing system 104 may receive or retrieve each various type of data (e.g., retrieve HCP data from an HCP repository (not shown, retrieve consumer data from the consumer demographic repository 120, etc.) prior to step 204. The data record request may request data records that are associated with or matches the data included in the data record request. In some embodiments, the data record request may request health data that is not associated with or does not match the data included in the data record request. In some embodiments, the data record request may be generated, by the provider computing system 104, to include an aggregation type (e.g., patient, HCP, location, etc.).

In some embodiments, at step 204, the provider computing system 104 may generate multiple data record request requests. For example, the provider computing system 104 may generate a data record request for each covered entity computing system 108 from which data records are sought. In other embodiments, the provider computing system 104 may generate a single, reused, data record request that is sent to each covered entity computing system 108 from which data records are sought. In one example, the provider computing system 104 may generate a data record request for all data records associated with a first medical product and within a specific timeframe; and a data record request for all data records associated with a specific diagnosis code and within a specific timeframe.

Additionally, at step 204, the provider computing system 104 may generate the data record request, at a specific time interval or rate (e.g., once a day, once a week, once a month, every 5 minutes, etc.). In some embodiments, the specific time interval or rate at which the data record request is generated determines the specific timeframe of the health data request. For instance, the provider computing system 104 may generate a data record request at a weekly time interval. As a result, the first data record request may be for the timeframe of Jan. 1, 2021-Jan. 7, 2021, and the second data record request may be for the timeframe of Jan. 8, 2021-Jan. 14, 2021. In other examples, the timeframes may overlap to capture latent data records, and the provider computing system 104 may remove duplicate data records as described further herein.

Once the provider computing system 104 has generated the data record request, the method 200 proceeds to step 208 at which the provider computing system 104 provides the data record request to the one or more covered entity computing systems 108. In some embodiments, the provider computing system 104 may provide the health data request over the network 118 via the network interface 126 to the one or more covered entity computing systems 108.

Once the provider computing system 104 has provided the data record request to the one or more covered entity computing systems, the method 200 proceeds to step 212 at which multiple data records are received from the one or more covered entity computing systems 108. The data records may be received in response to the provider computing system 104 providing the data record request to the one or more covered entity computing systems 108 and may be or include Rx data, Mx data, medical product data, transaction data, diagnosis data, procedure codes or procedure data, and other health data records described herein. For example, the data records may be prescription claims (Rx) data that includes deidentified PHI, medical product data, diagnosis data (e.g., a diagnosis code), HCP data (e.g., an NPI of a prescribing HCP), date/time data, facility or health care system location data, and transaction data. In another example, the data records may be medical claims (Mx) data that includes deidentified PHI, medical product data, procedure data (e.g., procedure code), diagnosis data (e.g., a diagnosis code), HCP data (e.g., an NPI of a prescribing HCP), date/time data, facility or health care system location data, and transaction data. In another example, the data records may be national health insurance (e.g., Medicare, Medicaid, etc.) claims data or electronic health record data including deidentified PHI, medical product data, diagnosis data (e.g., a diagnosis code), HCP data (e.g., an NPI of a prescribing HCP), date/time data, facility or health care system location data, and transaction data. Further, the received data records may correspond to or be associated with the HCP data, the consumer data, the timeframe, and/or the medical product data included in the data record request. For example, the data records received at step 212 may be matched with or include consumer data for each individual consumer of each prescription. For example, each piece of Rx data may be matched with demographic data associated with the consumer of the prescription. Further, the received data records may include deidentified PHI, transaction data, date/time data, and medical product data.

In some embodiments, the received data records may be aggregated based on the aggregation type included in the data record request. In one example, the data record request may include or identify the aggregation type of "patient". Accordingly, the health data received at step 212 may be aggregated by patient such that the data records are sorted or identifiable by patient (e.g., each column or row of the health data is a separate patient, each separate piece of health data is a separate patient, etc.). In one example, a piece (e.g., a row) of the data records may be associated with the tokenized NPI "12121212". Then, each part (e.g., a cell) of the piece may include an Rx transaction for the patient "12121212", an Mx transaction for the patient "12121212", a diagnosis code for the patient "12121212", a procedure code for the patient "12121212", and so on. In other embodiments, the provider computing system 104 may aggregate the received data records based on the aggregation type. In this regard, it should be understood that each piece of the aggregate health data may be associated with a specific grouping (e.g., a specific patient, a specific HCP, a specific location, etc.), but may include multiple transactions, prescriptions, diagnoses, procedures, dates, and the like therein. The aggregate data is aggregated such that multiple pieces of the data records (e.g., multiple prescriptions, multiple diagnoses, multiple procedures) associated with a common-denominator (e.g., a specific patient, a specific HCP, a specific location) are joined into a single piece of the aggregate health data record. Further, as described herein, the aggregate data may be aggregated such that multiple pieces of consumer data (e.g., age range, 3-digit zip code, zip code, payer type for each transaction (e.g., national health insurance (e.g., Medicare Part A), private insurance, cash), occupation, income range, etc.) associated with a common-denominator (e.g., a specific patient, a specific HCP, a specific location) are joined into a single piece of the aggregate health data record. For instance, a single health data record may include a part (e.g., a cell) representing age range (e.g., 20-29 years old) or other consumer data described herein.

As described herein, the PHI of the data record may be deidentified, by the one or more covered entity computing systems 108, in a variety of ways including through encryption, tokenization, and use of a hash function. In some embodiments, the one or more covered entity computing systems (e.g., the covered entity computing system 108) may use a consistent form of deidentification such that the same PHI input will return the same hash value or token. For example, if a data record included the name "John Smith," a resulting deidentified hash value may be "1234321." To be consistent, each of the one or more covered entity computing systems, when identifying the name "John Smith," may then return the hash value "123431." By using the same hash function across the one or more covered entity computing systems, the provider computing system 104 can make additional connections between the received data records and generate insights and statistical values. Further, less processing power is required by the provider computing system 104 as most of the data record matching is completed by the one or more covered entity computing systems prior to the data records being received by the provider computing system 104.

Once the provider computing system 104 has received the multiple data records from the covered entity computing system 108, the method 200 proceeds to step 216 at which the provider computing system 104 cleans the data records. For instance, at step 216, the provider computing system 104 may remove duplicate data records from the multiple data records. In one example, the provider computing system 104 may receive five data records (see FIG. 3) including a first data record for a rejected prescription, a second data record for a rejected prescription, a third data record for a rejected prescription, a fourth data record for an approved prescription, and a fifth data record for a reversed prescription. Further, the first data record may include a first date/time, a first reject code, a first deidentified ID (e.g., the number 1234321), and a first identified medical product. Likewise, the second data record may include a second date/time, a second reject code, a second deidentified ID, and a second identified medical product. Accordingly, in response to determining the first data record is substantially the same as or substantially matches the second data record (e.g., the first date/time being the same or similar (e.g., within a few minutes, within a few seconds, etc.) as the second date/time as well as the first reject code being the same as the second reject code, the first identified medical product being the same as the second medical product, and the first deidentified ID being the same as the second deidentified ID), the provider computing system 104 may clean the data records by removing at least one of the first data record or the second data record. In other embodiments, the provider computing system 104 may remove the data record with the least amount of data (e.g., the data record that includes less data overall). In other embodiments, the provider computing system may remove the data record that occurred first (e.g., with the earlier date/time).

Figure 3:
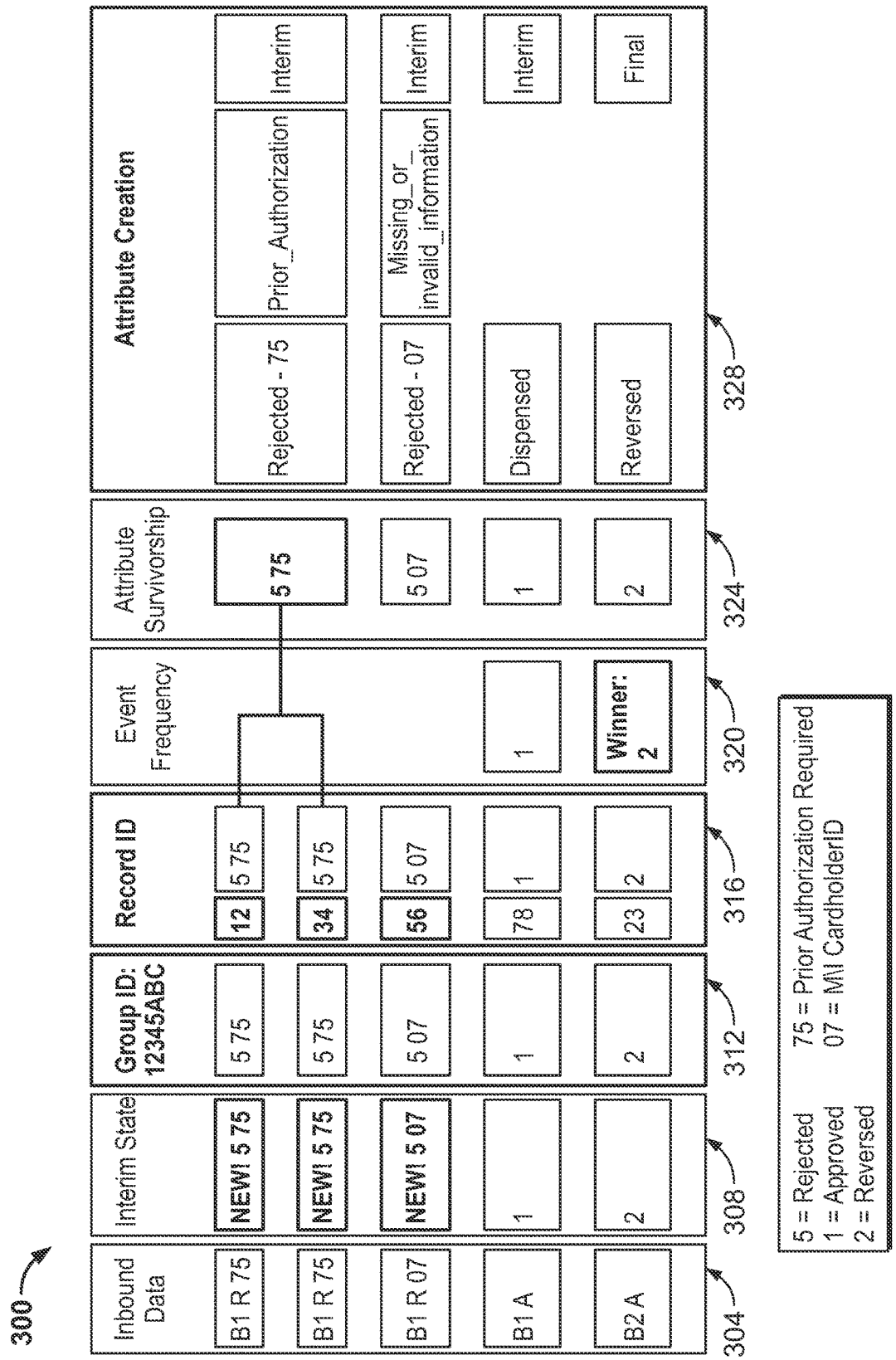
FIG. 3 is a data record pipeline diagram for generating combined data records, according to an example embodiment.

In some embodiments, to clean the data records, the provider computing system 104 may transform at least a portion of each data record from a rough value or key into a text value. For instance, as shown in FIG. 3, an inbound data record may include the status value "B1 R 75". Accordingly, the provider computing system 104 may determine the value or key "B1" is indicative of a Claims Billing (B1) transaction, the value or key "R" is indicative of a Rejection, and the value or key "75" is a rejection code. Accordingly, the provider computing system 104 may transform the value or key "R" to the term representing the status or state "Rejected" or "Rejection". In another example, the provider computing system may transform the value or key "R 75" to the interim value "5 75," which may then be transformed to the state term (e.g., "Rejected" or "Rejection,") as show in FIG. 3. In this regard, the state "key" may be a short (e.g., 1, 2, 3, 4, or 5 characters) value that represents the state of the data record but is not readily understandable without a legend or mapping (e.g., "5=rejected"), as shown at the bottom of FIG. 3. In comparison, the state "term" may be a set of words or values that provide a readily understandable state without a legend or mapping (e.g., "rejection," "rejected," "dispensed prescription," etc.).

In some embodiments, at step 216, the provider computing system 104 may perform a first cleaning of the data records. For instance, at step 216, the provider computing system 104 may modify or transform at least a portion of each data record from a value or key into an interim value or key (e.g., from B1 R 75 to NEW! 5 75 or from B1 A to 1, as shown in FIG. 3). Then, at a later time (e.g., after grouping the data records at step 220), the provider computing system 104 may perform a second cleaning of the data records. For instance, after step 220 and grouping the data records, the provider computing system 104 may deduplicate the data records of the group (e.g., as shown in FIG. 3) and perform a second transformation on the interim value or key (e.g., from B1 A to the term "dispensed", etc.) from the interim state key to the state term.

Once the provider computing system 104 has cleaned the data records, the method 200 proceeds to step 220 at which the provider computing system 104 generates a group for one or more of the cleaned data records and/or assigns the data records to the group. For instance, the provider computing system 104 may determine that one or more of the multiple cleaned data records are a part of the same event or prescription claim. In the example shown in FIG. 3, five data records are apart of the same group and are assigned to the group together by the provider computing system 104. As shown, the group includes a first rejection data record, a second rejection data record, a third rejection data record, a fourth dispensed data record, and a fifth reversed data record. In this regard, at step 220, the provider computing system 104 may generate multiple groups of one or more of the cleaned data records and assign the data records to the group. For instance, a first, second, and third data record may be grouped into a first group (e.g., event ID 12345ABC) associated with a first event or prescription claim, and a fourth and fifth data record may be grouped into a second group (e.g., event ID 12346ABC) associated with a second event or prescription claim. This process may be repeated such that thousands of data records are grouped into thousands or hundreds of groups.

To group the data records, the provider computing system 104 may combine or append/concatenate the data record type (e.g., Rx, Mx, EHR, etc.), the medical product name or identifier (e.g., National Drug Code (NDC), the deidentified patient identifier or value, the date and/or time of the data record, the HCP identifier (e.g., NPI), and/or a fill number of each data record. A fill number is a number that is assigned to each time the prescription is dispensed at a pharmacy. It is also known as a refill number. The fill number is typically printed on the prescription label, along with the patient's name, the name of the medication, the dosage, and the date the prescription was filled. For instance, the provider computing system 104 may combine the data record type (e.g., Rx), the medical product identifier (e.g., the NDC 69618-016-01), the deidentified patient identifier (e.g., 1234321), the date of the data record or transaction (e.g., Jan. 1, 2023), the HCP identifier (e.g., NPI #012321), and the fill number of the data record (e.g., 12) to create an intermediary group identifier for the data record.

In some embodiments, the provider computing system 104 may generate a different intermediate group identifier for Mx data records (as compared to Rx data records) due to the difference between Rx data records and Mx data records. For instance, to group Mx data records, the provider computing system 104 may combine or append/concatenate the data record type (e.g., Mx), the medical product name or identifier, the deidentified patient identifier or value, a procedure code associated with or included in the Mx data record, a procedure modifier code or value, the date and/or time of the data record, the HCP identifier (e.g., NPI), a patient location value (e.g., a zip code) in which the procedure occurred, and/or a charge number or identifier. For instance, the provider computing system 104 may combine the data record type (e.g., Mx), the medical product identifier (e.g., the NDC 69618-016-01), the deidentified patient identifier (e.g., 1234321), a procedure code (e.g., the procedure code 90658), a procedure modifier code (e.g., the value 77), the date of the data record or transaction (e.g., Jan. 1, 2023), the HCP identifier (e.g., NPI #012321), the patient location value (e.g., the zip code 53209), and charge number of the data record (e.g., 123222) to create an intermediary group identifier for the data record. In this regard, a group may only contain data records of the same type (e.g., a group including all Mx records, a group including all Rx records, etc.).

The intermediary group identifier may be used by and generated by the provider computing system 104 because the values appended or concatenated to form the intermediary group identifier are the same across the data records of a group of data records. For instance, as described herein, each group of data records may represent the lifecycle or pathway of a single prescription or transaction. In one example, a patient may receive a prescription from their HCP which may be provided to a pharmacy (e.g., CVS® or Walgreens®). The pharmacy may provide the prescription to the patient's insurance who may deny the prescription for one or more reasons (e.g., incorrect or missing information on the prescription, no prior authorization, etc.). The patient may then get a prior authorization from their HCP and insurance, the insurance may approve the prescription, and the pharmacy may fill the prescription. However, after deciding the prescription is not needed, the patient may not pick-up the prescription, and the pharmacy may reverse or cancel the prescription and provide a reversal request to the insurance company indicating as such. At each of these steps, the insurance company (and a covered entity computing system 108 thereof) may generate a data record indicating the status or state of the prescription. For instance, FIG. 3 shows six separate data records that include three rejections of a prescription, an approval of a prescription, and a reversal of the approval of the prescription. However, for each of these data records, the data record type (e.g., Rx, Mx, EHR, etc.), the medical product name or identifier (e.g., National Drug Code (NDC), the deidentified patient identifier or value, the date and/or time of the data record, the HCP identifier (e.g., NPI), and the fill number of each data record is the same. In this regard, each intermediary group identifier provides for a unique group identifier that is shared uniquely among data records of the group and provides for simple and quick identification of the data records of the group.

Additionally, once the provider computing system 104 has generated the intermediary group identifier, the provider computing system 104 may then tokenize or hash the intermediary group identifier to generate the group or event identifier. For instance, the provider computing system 104 may perform a hash function on the intermediary group identifier of the data record to generate group or event identifier. In one example, the provider computing system 104 may perform an SHA-256 hash function (secure hash algorithm 2, 256-bit) on the intermediary group identifier to generate the group identifier. In other examples, the provider computing may use a message digest 5 (MD5) hash function, a secure hash algorithm 1 (SHA-1) hash function, a secure hash algorithm 3 (SHA-3) or a BLAKE2 hash function on the intermediary group identifier to generate the group or event identifier.

The provider computing system 104 may add the generated group identifier to the cleaned data records and then assign or group the data records to the group based on the group identifier. For instance, the provider computing system 104 may assign the five data records to the group shown in FIG. 3 by adding the group identifier to the data records. In another example, the provider computing system 104 may assign the data records to the group by storing the data records in relation to the group identifier such that the data records of the same group are automatically stored together or can be queried together. For instance, to return data records of a specific group, the provider computing system 104 may query or search the data record repository 132 for data records that have a specific group number (e.g., 1234321). In this regard, the data records are automatically grouped or assigned to the group through generation of the group identifier and the addition of the group identifier to the data record itself.

SHA-256 is a cryptographic hash function that takes an input of any size and produces a 256-bit output, also known as a hash value or digest. SHA-256 works by breaking the input message into 512-bit blocks and processing each block using a series of mathematical operations. These operations involve a variety of constants and functions designed to make the hash function resistant to collision attacks. A collision attack occurs when two different input messages produce the same hash value. SHA-256 has several important properties that provide improved security. For instance, SHA-256 has improved preimage resistance, collision resistance, avalanche effects, and is deterministic. For instance, using SHA-256 it is computationally infeasible to find an input message (e.g., intermediate group identifier) that produces a given hash value. Further, using SHA-256, it is computationally infeasible to find two different input messages that produce the same hash value. Moreover, using SHA-256, a small change in the input message produces a large change in the hash value. Finally, SHA-256 is deterministic such that given the same intermediary group identifier, SHA-256 will always produce the same hash value, all of which are important for the security of the provider computing system 104 and the data records themselves.

By generating the intermediary group identifier and then consistently hashing the intermediary group identifier, the provider computing system 104 provides for an improvement over typical sorting or grouping systems such that the present systems and methods do not have to manually sort or group each of the data records by finding matching characteristics, as may be done in typical grouping systems. Instead, because the intermediary group identifier inherently is shared uniquely among data records of the group and the hashed value is a consistent output, the provider computing system 104 can simply generate the intermediary group identifier, hash the intermediary group number to generate the group identifier, and then group or sort by the group identifier. For instance, typical computerized sorting systems may select a first data record and then find a second data record with matching data or characteristics by checking each data record of the received data records. This can be slow and computationally expensive such that hundreds of sorting algorithms have been developed to speed up this process and lower computational costs. In comparison, the present systems and methods generate an intermediary group identifier and then hash the intermediary group identifier to generate the group identifier. The provider computing system 104 may then store the data records in relation to the group identifier such that the data records of the same group are automatically stored together and do not have to be sorted via a computationally expensive algorithm. For instance, to return data records of a specific group, the provider computing system 104 may query or search the data record repository 132 for data records that have a specific group number (e.g., 1234321). In this regard, the data records are automatically grouped or sorted together through generation of the group identifier, which uses less processing power and memory by not having to utilize a sorting algorithm. For instance, sorting algorithms can be computationally expensive, especially when dealing with large datasets. By avoiding a sorting algorithm, the present systems and methods voiding significantly reduce the processing time and resource usage required for data record grouping. Likewise, sorting algorithms typically involve rearranging data in memory, which can increase cache misses and reduce data locality. By avoiding a sorting algorithm, the present systems and methods provide for improved data locality, leading to faster data access and overall performance gain.

Additionally, by hashing the intermediary group numbers using SHA-256, the provider computing system 104 provides for secure grouping of the data records while generating a consistent group or event identifier (e.g., a 256-bit value) that is the same for data records of the same group. For instance, by using SHA-256 to hash the intermediary group identifier, the provider computing system 104 provides for improved security on the intermediary group identifier such that it is computationally infeasible to determine the intermediary group identifier based on the group identifier, while still producing a consistent and unique group identifier for each intermediary group identifier. In this regard, the present systems and methods provide for improved data security which leads to increased system uptime (compared to traditional querying systems). For instance, when data is more secure, systems are less likely to be disrupted by cyberattacks which provides for increased uptime and improved productivity by the provider computing system 104.

In some embodiments, at step 220, the provider computing system 104 may generate a group ID for each group and add the event or group ID to the data records within the group. For instance, the first group of data records above was given the generated event ID 12345ABC. Accordingly, at step 220, the provider computing system 104 may add the group or event ID "12345ABC" to each of the data records within the first group. For instance, the data record may be a row or column of data within a CSV file (e.g., an electronic file). Accordingly, the provider computing system 104 may add an additional value including the event ID to each row or column of data.

Once the provider computing system 104 has grouped or added one or more of the cleaned data records to a group, the method 200 proceeds to step 224 at which the provider computing system 104 determines or generates one or more attributes for each data record of the group. For instance, the provider computing system 104 may determine an order or disposition of each data record of the group. For example, as shown in FIG. 3, the provider computing system 104 may determine that a reversal data record is the final or last data record and that three other data records are interim data records (e.g., the reversal data record relates to the final outcome of the prescription and the other data records relate to the pathway to the final outcome). In response, the provider computing system 104 may generate an attribute "Interim" for each interim data record and an attribute "final" for the determined final data record of the group. To determine the order or disposition attribute for each data record, the provider computing system 104 may analyze the approval and reversal data records of the group (e.g., the data records that originally include the code "B1 A" for approval" and the code "B2 A" for reversal. If the group includes more approval data records than reversal data records (e.g., one approval data record and no reversal data record), the provider computing system 104 may determine the approval data record is the "final" data record and the other data records have the attribute "interim." In comparison, if the group includes more reversal data records or the same number of approval and reversal data records (e.g., one approval data record and one reversal data record), the reversal data record is the "final" data record and the other data records have the attribute "interim." In this regard, the disposition "final" may indicate the data record was generated after (e.g., at a date/time after) the data records with the disposition "interim" such that the disposition "final" is the last or final data record of the group of data records.

In another example, the provider computing system 104 may determine a reject code classification attribute for data record of the group with the state or status of "rejected." For instance, the group of data records may include a first rejected data record with the reject code "75" and a second rejected data record with the reject code "07". In response, the provider computing system 104 may determine the first data record is associated with a first reject code classification (e.g., "Prior Authorization") and the second data record is associated with a second reject code classification (e.g., "Missing or Invalid Information"). The first reject code classification may indicate the prescription was rejected by an insurance company due to not having a prior authorization on file, and the second reject code classification may indicate the prescription was rejected by an insurance company because at least a portion of the information provided to the insurance company was missing or invalid. Other possible reject code classifications include an "other" classification, a "Drug Utilization Review (DUR)" classification, a "product or service not covered" classification, and a "quantity limit" classification.

In some embodiments, the provider computing system 104 may further generate a record ID attribute associated with each data record of the group of data records. For instance, the provider computing system 104 may generate a unique record ID (e.g., 20) that uniquely identifies the data record within the group of data records. While the record ID may be reused among the various groups, the record ID may be unique to the group of data records.

Once the provider computing system 104 has determined or generated the attributes, the method 200 proceeds to step 228 at which the provider computing system 104 adds one or more of the attributes to each of the cleaned data records of the group of data records to generate combined data records. For instance, the provider computing system 104 may determine the disposition attribute for each data record of the group of data records and add the disposition attribute to the respective data record. In one example, the data record may be represented by a row including multiple cells or values (e.g., a value for the deidentified patient identifier, a value for the prescribing HCP NPI, one or more values for demographic features of the patient, a value for date/time, a value for the status or state of the data record (e.g., approval, rejection, reversal, etc.), a value for the data record type (e.g., Rx, Mx, EHR, etc.), a value for the name or identifier of the medical product of the data record, etc.). In this regard, the provider computing system 104 may add the additional attributes to the respective data records of the group and generate combined data records. The combined data records may be augmented data records that include the additional attributes to provide further value to the data records. In this regard, compared with the data records received by the provider computing system 104, the combined data records may each include an additional value for the status or state of data record (e.g., "approval", "rejection") (as compared to a key or value that must be interpreted (e.g., B1 R 75), an additional value for the group or event identifier of the group into which the data record was grouped, and one or more additional values the determined or generated attributes (e.g., an additional value for the rejection code classification and/or an additional value for the disposition attribute of the data record).

In some embodiments, steps 224-228 may be repeated for each group of data records that were generated at step 220. For instance, the provider computing system 104 may generate three groups of data records (e.g., a first group of Mx data records, a second group of Rx data records, and a third group of Rx data records, etc.), each group including three data records. Accordingly, the provider computing system 104 may generate attributes for each data record of each group and add the attributes to the respective data records to generate combined data records.

Once the provider computing system 104 has added one or more of the attributes to each of the cleaned data records of the group of data records to generate combined data records, the method 200 proceeds to step 232 at which the provider computing system 104 stores the combined data records in the data record repository 132. In some embodiments, each combined data record may be stored in association with the respective medical product(s), the aggregation type, the timeframe, the group identifier, and/or the type of the data record (e.g., Rx, Mx, EHR, government health data, etc.). For instance, the received data records may be stored in the data record repository 132 in association with (and is queryable/searchable by) the medical product and the timeframe of the data record request (and associated with the combined data record). In another example, the combined data records may be stored in the health data repository 132 in association with (and is queryable/searchable by) the aggregation type (e.g., patient) of the data record request. In some embodiments, the provider computing system 104 may store each separate type of combined data records (e.g., Rx data, Mx data, EHR) in a separate repository (not shown).

Once the provider computing system 104 has stored the combined data records in the data record repository 132, the method 200 proceeds to step 236 at which the provider computing system 104 receives a customizable query. In some embodiments, the query may be received from the user computing device 112. As described herein, the customizable query is a dynamic and customizable query which may be designed by the user via the user computing device 112 and provided to the provided to the provider computing system 104 for cleaning and generation. For instance, the provider computing system 104 may generate a query page (also referred to as a query-designer or builder page, not shown) and provide the query page to the user computing device 112 for rendering and display thereon. Through interaction with the query page, the user of the user computing device 112 may design the customizable query and provide the customizable query to the provider computing system 104. The customizable query may include multiple configuration properties (e.g., a first configuration property, a second configuration property, a third configuration property, etc.) and one or more operators, as will be described further herein.

In some embodiments, the customizable query may be received in or as a part of an electronic file generation request. The electronic file generation request may further include a recipient address for the electronic file, a file type (e.g., PDF file, Excel® file, CSV file, etc.), of the electronic file, one or more statistical values to generate, and/or a date or time on which the electronic file is to be generated. For instance, at step 236, the provider computing system 104 may receive an electronic file generation request. The electronic file generation request may include a recipient address (e.g., person1@gmail.com), a file type (e.g., PDF file), the customizable query, and the date Jul. 1, 2021. Further, the electronic file generation request may indicate the provider computing system 104 is to generate the statistical value total prescriptions (TRx) for each combined data record.

In some embodiments, after receiving the initial customizable query from the user computing device 112 (e.g., at or after step 236), the provider computing system 104 may clean and transform the initial query and generate a final customizable query. For instance, in response to receiving the initial customizable query, the provider computing system 104 may modify (i.e., translate) the query to a specific query or data query language (e.g., American National Standards Institute (ANSI) Structured Query Language (SQL), Scala Query Language (Scala QL), etc.). In some embodiments, the specific query or data query language may be based on the data record repository 132. For example, in response to the data record repository 132 being a relational database, the provider computing system 104 may modify or standardize (i.e., translate) the initial customizable query to the SQL. In another example, in response to the data record repository 132 being an Amazon Athena service instance, the provider computing system 104 may modify or standardize the initial customizable query to the SQL. In another example, in response to the data record repository 132 being an Amazon Simple Storage Service® (S3) Bucket, the provider computing system 104 may modify or standardize the initial customizable query to the Java programming language. In some embodiments, to clean the initial query, the provider computing system 104 may remove or replace specific characters or expressions. For instance, the provider computing system 104 may replace the character '=' in the expression "age=25" with the character '=='. In another example, the provider computing system 104 may replace the term age in the expression "age=25" with the term "age_c". In other examples, the provider computing system 104 may replace a list of medical products (e.g., Drug X, Drug Y, Drug Z, etc.) with a configuration property representing each medical property and the operator "OR" between each (e.g., "(Drug X OR Drug Y OR Drug Z)")

In some embodiments, after receiving the customizable query, the provider computing system 104 may store the customizable query (e.g., within a query repository (not shown)) and/or generate a query file. The query file may be a specific file type (e.g., Excel file, PDF file, CSV File, etc.) and may be provided to the user computing device 112 by the provider computing system 104. For instance, the provider computing system 104 may generate a query file including a representation of the customizable query (e.g., the configuration properties and/or operators used in the customizable query) and provide the query file to the user computing device 112. In this regard, the user of the user computing device 112 may then replicate the same customizable query, based on the query file.

Once the provider computing system 104 has received the customizable query from the user computing device 112, the method 200 proceeds to step 240 at which the provider computing system 104 (and more particularly the processing circuit 128) executes the (final) customizable query on the data record repository 132 to select/retrieve or receive at least a portion of the combined data records (e.g., one or more of the combined data records) stored in the data record repository 132. For instance, at step 236, the provider computing system 104 may provide the (final) customizable query to the data record repository 132 which may then retrieve the matching or resulting combined data records from therein. In another example, the provider computing system 104 (and more particularly the processing circuit 128) may parse the data record repository 132 based on the customizable query and select or retrieve the matching or resulting combined data records.

As described herein, the portion of the combined data records selected or received from the data record repository 132 may match or satisfy the customizable query. In other words, the portion of the combined data records may match or meet the configuration propertie(s) and the operator(s) of the customizable query. For instance, the customizable query may include a first configuration property (e.g., Drug X), a second configuration property (e.g., a status or state of "rejected"), and a third configuration property (e.g., Mx data), with the operator "OR" between the first configuration property and the second configuration property and the operator "AND" between the first two configuration properties and the third configuration property (i.e., "((Drug X OR status: "rejected") AND Mx data))"). In response to receiving the customizable query, the provider computing system 104 may execute the query and select or receive each combined data record from the health data repository that is associated with Drug X or that has a state of rejected, and is the data record type of Mx.

In some embodiments, executing the customizable query may include multiple steps or stages. For instance, at a first step, the provider computing system 104 may execute the query and select or receive each combined data record from the data record repository 132 that is that is associated with Drug X or has the status rejected. Then, at a second step, the provider computing system 104 may filter the resulting combined data records to remove each combined data record that does not have the data record type of Mx.

In some embodiments, at or after step 240 and executing the user-defined query, the provider computing system 104 may generate or determine the one or more statistical values of the electronic file generation request based on and for each piece of the combined data records. For instance, for each combined data record, the provider computing system 104 may determine a demographic value associated with the patient (e.g., a gender of the patient, an income range of the patient, etc.).

Once the provider computing system 104 has executed the customizable query and selected the portion of the health data from the health data repository 132, the method 200 proceeds to step 244 at which the provider computing system 104 generates an electronic file including the selected portion of the combined data records. In some embodiments, the electronic file further includes the one or more statistical values described herein. For instance, the electronic file may include the combined data records and the statistical values (e.g., one or more statistical values for each patient or data record).

The electronic file may be generated as a specific file type as set by the user computing device 112 in the electronic file generation request. For example, the electronic file may be generated as a CSV file, an Excel File (XLSX file), an XML file, a JSON file, and the like. By allowing the user computing device 112 to decide and set the specific file type of the electronic file in the electronic file generation request and not generating the electronic file as one specific file type, the provider computing system 104 may provide for improved shareability of the electronic file as well as use less processing power and memory. For example, in situations where the electronic file is only generated as a specific, non-dynamic, file type, third-party computing systems and recipient computing devices (e.g., the user computing device 112) may have to perform additional file modification and conversion or request the provider computing system 104 to do so, which requires additional processing power, memory (to keep two files), and time. In comparison, the system 100 and the provider computing system 104 allow the user to specify the file type of the electronic file through the electronic file generation request. Accordingly, the user, via the user computing device 112, can specify the wanted file type the first time and the provider computing system 104 will generate the electronic as the specified file type. As a result, no additional file modification or conversion is required reducing processing power usage, memory usage, and overall processing time for the provider computing system 104.

Once the provider computing system 104 has generated the electronic file, the method 200 proceeds to step 248 at which the electronic file is provided or output. In some embodiments, the electronic file is output to the file destination address of the electronic file generation request. The file destination address may be any type of address or destination (e.g., IP address, web address, email address, file transfer protocol (FTP) address, and the like) to which the electronic file may be electronically transmitted or provided. In one example, the file destination address may be another server or circuit of the provider computing system 104 that is configured to receive the electronic file (e.g., Veeva Nitro®). In another example, the file destination address may be a web address of the Amazon S3® cloud storage web service. In another example, the file destination address may be the IP address of the user computing device 112 and the electronic file may be provided to the user computing device 112.

Referring now to FIG. 3, a data record pipeline diagram 300 is shown, according to an example embodiment. As shown and described herein, the data record pipeline diagram 300 shows the change to five data records during the intaking, cleaning, and transforming of the method 200. For instance, the data record pipeline diagram 300 includes five data records of the same group (which is then reduced to four) at seven separate stages including a first or intake stage 304, a second or transaction status stage 308, a third or grouping stage 312, a fourth or record ID stage 316, a fifth or disposition stage 320, a sixth or deduplication stage 324, and a seventh or attribute creation stage 328.

The first stage 304 may correspond to the step 212 of the method 200 and corresponds with the receipt of multiple data records by the provider computing system 104. For instance, as shown, at stage 304, the provider computing system 104 receives six separate data records including a first "B1 R75" data record, a second "B1 R75" data record, a third "B1 R07" data record, a fourth "B1 A" data record, and a fifth "B2 A" data record. As described herein each of the data records may include additional fields or data (not shown) such as a medical product name of identifier, a date of the transaction, a data record type (e.g., Mx, Rx, etc.), an HCP identifier, location data or a zip code, a deidentified patient identifier, fill number, a procedure code, a procedure modifier code, a charge number, and the like. In this regard, the portion of each of the data records shown may correspond with the status or state of the data record as well as a reject code of the data record (where applicable).

The second stage 308 may correspond to the step 216 of the method 200 and corresponds with the transformation of the status of the received data records from a code or key to an interim value. For instance, as shown, at stage 308, the provider computing system 104 transforms the value B1 R 75 to "NEW! 5 75"; the value B1 R 07 to "NEW! 5 07"; the value B1 A to 1; and the value B2 A to 2.

The third stage 312 may correspond to step 220 at which the provider computing system 104 generates a group associated with the data records. For instance, as shown, the provider computing system 104 may generate a group identifier "12345ABC" for each of the six data records of the group and adds the group identifier to the six data records.

The fourth stage 316 may correspond to steps 224 and 228 of the method 200 at which the provider computing system 104 may generate a record identifier for each data record of the group and add the identifier to each of the data records. For instance, as shown, at the fourth stage 316 the provider computing system 104 generates the event identifier for each data record of the group. Likewise, the fifth stage 328 may correspond to steps 224 and 228 of the method 200 at which the provider computing system 104 determines the order or disposition attribute for the data records of the group by determining which data record was the final data record and adds the disposition attribute for each data record to the respective data record.

The sixth stage 324 may correspond to the step 216 of the method 200 and corresponds with the deduplication of the data records of the group. For instance, as shown, at stage 324, the provider computing system 104 determines that the two B1 R 75 data records are a substantial duplicate and combines the two data records into a single B1 R 75 data record. In another example, the provider computing system 104 may determine that two B2 A records are substantial duplicates and combine the two data records into a single B2 A data record.

The seventh stage 328 may correspond to steps 216, 224, and 228 of the method 200 at which the provider computing system 104. For instance, as shown, at the seventh stage 328 the provider computing system 104 may transform the interim status or states of the data records into an easily readable value (e.g., "rejected," "dispensed" or "approved," "reversed," etc.). Likewise, at the seventh stage, the provider computing system 104 may determine a reject code classification for each of the data records with a state of "rejected" and add the reject code classification to the respective data records.

The embodiments described herein have been described with reference to the drawings. The drawings illustrate certain details of specific embodiments that implement the systems, methods, and programs described herein. However, describing the embodiments with drawings should not be construed as imposing on the disclosure any limitations that may be present in the drawings.

It should be understood that no claim element herein is to be construed under the provision of 35 U.S.C § 112(f), unless the element is expressly recited using the phrase "means for."

As used herein, the term "circuit" may include hardware structured to execute the functions described herein. In some embodiments, each respective "circuit" may include machine-readable media for configuring the hardware to execute the functions described herein. The circuit may be embodied as one or more circuitry components including, but not limited to, processing circuitry, network interfaces, peripheral devices, input devices, output devices, sensors, etc. In some embodiments, a circuit may take the form of one or more analog circuits, electronic circuits (e.g., integrated circuits (IC), discrete circuits, system on a chip (SOC) circuits), telecommunication circuits, hybrid circuits, and any other type of "circuit." In this regard, the "circuit" may include any type of component for accomplishing or facilitating achievement of the operations described herein. For example, a circuit as described herein may include one or more transistors, logic gates (e.g., NAND, AND, NOR, OR, XOR, NOT, XNOR), resistors, multiplexors, registers, capacitors, inductors, diodes, wiring, and so on.

The "circuit" may also include one or more processors communicably coupled to one or more memory or memory devices. In this regard, the one or more processors may execute instructions stored in the memory or may execute instructions otherwise accessible to the one or more processors. In some embodiments, the one or more processors may be embodied in various ways. The one or more processors may be constructed in a manner sufficient to perform at least the operations described herein. In some embodiments, the one or more processors may be shared by multiple circuits (e.g., circuit A and circuit B may comprise or otherwise share the same processor which, in some example embodiments, may execute instructions stored, or otherwise accessed, via different areas of memory). Alternatively or additionally, the one or more processors may be structured to perform or otherwise execute certain operations independent of one or more co-processors. In other embodiments, two or more processors may be coupled via a bus to enable independent, parallel, pipelined, or multi-threaded instruction execution. Each processor may be implemented as one or more general purpose processors, application specific integrated circuits (ASICs), field programmable gate arrays (FPGAs), digital signal processors (DSPs), or other suitable electronic data processing components structured to execute instructions provided by the memory. The one or more processors may take the form of a single core processor, a multi-core processor (e.g., dual core, quad core, etc.), microprocessor, etc. In some embodiments, the one or more processors may be external to the apparatus. For example, the one or more processors may be a remote processor (e.g., a cloud-based processor). Alternatively or additionally, the one or more processors may be internal and/or local to the apparatus. In this regard, a circuit or components thereof may be disposed locally (e.g., as part of a local server, a local computing system) or remotely (e.g., as part of a remote server such as a cloud-based server). To that end, a "circuit" as described herein may include components that are distributed across one or more locations. Further, the circuits of the processing circuit described herein may be distributed across one or more locations (e.g., each as part of one or more remote servers).

An example system for implementing the overall system or portions of the embodiments might include a general-purpose computing device in the form of computers, including a processing unit, a system memory, and a system bus that couples various system components including the system memory to the processing unit. Each memory device may include non-transient volatile storage media, non-volatile storage media, non-transitory storage media (e.g., one or more volatile and/or non-volatile memories), etc. In some embodiments, the non-volatile storage media may take the form of ROM, flash memory (e.g., flash memory such as NAND, 3D NAND, NOR, 3D NOR), EEPROM, MRAM, magnetic storage, hard disks, optical disks, etc. Combinations of the above are also included within the scope of machine-readable media. In this regard, machine-executable instructions comprise, for example, instructions and data which cause a general-purpose computer, special purpose computer, or special purpose processing machine to perform a certain function or group of functions. Each respective memory device may be operable to maintain or otherwise store data relating to the operations performed by one or more associated circuits, including processor instructions and related data (e.g., database components, object code components, script components), in accordance with the example embodiments described herein.

It should also be noted that the term "input devices," as described herein, may include any type of input device including, but not limited to, a keyboard, a keypad, a mouse, a joystick, or other input devices performing a similar function. Comparatively, the term "output device," as described herein, may include any type of output device including, but not limited to, a computer monitor, printer, facsimile machine, or other output devices performing a similar function.

It should be noted that the term "field," as described herein may include any form of an input field through which the user interfaces shown and described may receive input from a user of a computing device. For instance, the term "field" may include a text field, a drop-down box and selectable options, a lookup box, a search bar, an icon, one or more checkboxes, one or more radio buttons, a button, a toggle, a date field, a slider, and the like. Further, each "field" may include and/or receive data that is associated with a data object as described herein.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied. The order or sequence of any element or apparatus may be varied or substituted according to alternative embodiments. Accordingly, all such modifications are intended to be included within the scope of the present disclosure as defined in the appended claims. Such variations will depend on the machine-readable media and hardware systems chosen and on designer choice. It is understood that all such variations are within the scope of the disclosure. Likewise, software and web implementations of the present disclosure could be accomplished with standard programming techniques with rule-based logic and other logic to accomplish the various database searching steps, correlation steps, comparison steps, and decision steps.

The foregoing description of embodiments has been presented for purposes of illustration and description. It is not intended to be exhaustive or to limit the disclosure to the precise form disclosed, and modifications and variations are possible in light of the above teachings or may be acquired from this disclosure. The embodiments were chosen and described in order to explain the principles of the disclosure and its practical application to enable one skilled in the art to utilize the various embodiments and with various modifications as are suited to the particular use contemplated. Other substitutions, modifications, changes, and omissions may be made in the design, operating conditions and embodiment of the embodiments without departing from the scope of the present disclosure as expressed in the appended claim.

What is claimed is:

1. A method for querying one or more combined data records of a data repository comprising:
   generating, by a provider computing system, a data record request;
   providing, by the provider computing system, the data record request to one or more covered entity computing systems;
   receiving, by the provider computing system, a plurality of data records from the one or more covered entity computing systems;
   cleaning, by the provider computing system, the plurality of data records;
   assigning, by the provider computing system, at least two of the cleaned data records to a group;
   generating, by the provider computing system, at least one attribute based on one or more of the cleaned data records of the group;
   adding, by the provider computing system, the at least one attribute to the cleaned data records of the group to generate a plurality of combined data records;
   storing, by the provider computing system, the plurality of combined data records in the data repository of the provider computing system;
   receiving, by the provider computing system, a query including a configuration property;
   executing, by the provider computing system, the query on the data repository to select each combined data record from the data repository which matches the configuration property of the query;
     generating, by the provider computing system, an electronic file including the selected combined data records; and
   outputting, by the provider computing system, the electronic file.

2. The method of claim 1, wherein the group is a first group that includes at least a cleaned first data record and a cleaned second data record, wherein the at least one attribute is at least one first attribute, wherein the plurality of combined data records are a first plurality of combined data records, and wherein the method further comprises:
   assigning, by the provider computing system, at least a cleaned third data record and a cleaned fourth data record to a second group;
   generating, by the provider computing system, at least one second attribute based on the cleaned data records of the second group;
   adding, by the provider computing system, the at least one second attribute to the cleaned data records of the second group to generate a second plurality of combined data records; and
   storing, by the provider computing system, the second plurality of combined data records in the data repository of the provider computing system.

3. The method of claim 1, wherein the plurality of data records comprises at least a first data record, a second data record, and a third data record, and wherein cleaning the plurality of data records comprises:
   determining, by the provider computing system, the second data record substantially matches the third data record; and
   removing, by the provider computing system, the third data record without removing the second cleaned data record to generate a cleaned second data record.

4. The method of claim 1, wherein the plurality of data records each include a state key, and wherein cleaning the plurality of data records comprises:
   determining, by the provider computing system, a state term for each state key of each data record; and
   replacing, by the provider computing system, the state key of each data record with the determined state term.

5. The method of claim 1, wherein generating the at least one attribute based on one or more of the cleaned data records of the group comprises:
   determining, by the provider computing system, a disposition of each cleaned data record of the group; and generating, by the provider computing system, a disposition attribute for each cleaned data record of the group based on the determined disposition of each cleaned data record.

6. The method of claim 5, wherein the provider computing system determines at least one disposition is an interim disposition and at least one disposition is a final disposition indicating the cleaned data record including the final disposition was generated after the cleaned data record including the interim disposition, and wherein the provider computing system generates at least one interim disposition attribute and at least one final disposition attribute.

7. The method of claim 1, wherein at least one of the cleaned data records of the group includes a rejection code, and wherein generating the at least one attribute based on one or more of the cleaned data records of the group comprises:
determining, by the provider computing system, a classification for each of the rejection codes of the cleaned data records of the group; and
generating, by the provider computing system, a classification attribute for each cleaned data record of the group that includes a rejection code based on the determined classification.

8. The method of claim 1, wherein the plurality of data records includes a first data record and a second data record, wherein each data record of the plurality of data records includes a medical product code, a date, and a health care provider (HCP) identifier, and wherein assigning the at least two data records to the group comprises:
combining, by the provider computing system, the medical product code, the date, and the HCP identifier of the cleaned first data record to generate a first intermediate group identifier;
generating, by the provider computing system, a group identifier based on the first intermediate group identifier by performing a hashing algorithm on the first intermediate group identifier;
assigning, by the provider computing system, the cleaned first data record to the group by adding the group identifier to the cleaned first data record;
combining, by the provider computing system, the medical product code, the date, the HCP identifier, and the deidentified identifier of the cleaned second data record to generate a second intermediate group identifier;
generating, by the provider computing system, the group identifier based on the second interim group identifier by performing a hashing algorithm on the second intermediate group identifier; and
assigning, by the provider computing system, the cleaned second data record to the group by adding the group identifier to the cleaned second data record.

9. The method of claim 1, wherein the configuration property is at least one of: a medical product code, a timeframe, the at least one attribute, a procedure code, a location, a health care provider (HCP) specialty, an age, or a gender.

10. The method of claim 1, wherein the plurality of data records is a first plurality of data records, wherein the one or more covered entity computing systems comprise a first covered entity computing system associated with a pharmacy and a second covered entity computing system associated with a medical claims company, and wherein the method further comprises:
receiving, by the provider computing system, the first plurality of data records from the first covered entity computing system, wherein each data record of the first plurality of data records comprises prescription claim (Rx) data including deidentified protected health information (PHI);
receiving, by the provider computing system, a second plurality of data records from the second covered entity computing system, wherein each data record of the second plurality of data records comprises medical claim (Mx) data including deidentified protected health information (PHI);
cleaning, by the provider computing system, the second plurality of data records;
assigning, by the provider computing system, at least two of the cleaned data records of the second plurality of data records to a second group;
generating, by the provider computing system, at least one second attribute based on the cleaned data records of the second group;
adding, by the provider computing system, the at least one second attribute to the cleaned data records of the second group to generate a second plurality of combined data records; and
storing, by the provider computing system, the second plurality of combined data records in the data repository of the provider computing system.

11. A method for querying one or more combined data records of a data repository comprising:
generating, by a provider computing system, a data record request;
providing, by the provider computing system, the data record request to one or more covered entity computing systems;
receiving, by the provider computing system, a plurality of data records comprising a first data record, a second data record, a third data record, and a fourth data record from the one or more covered entity computing systems;
cleaning, by the provider computing system, the plurality of data records;
assigning, by the provider computing system, at least the cleaned first data record and the cleaned second data record to a first group;
assigning, by the provider computing system, at least the cleaned third data record and the cleaned fourth data record to a second group;
generating, by the provider computing system, at least one first attribute based on one or more of the cleaned data records of the first group;
generating, by the provider computing system, at least one second attribute based on one or more of the cleaned data records of the second group;
adding, by the provider computing system, the at least one first attribute to the cleaned data records of the first group to generate a first plurality of combined data records;
adding, by the provider computing system, the at least one second attribute to the cleaned data records of the second group to generate a second plurality of combined data records;
storing, by the provider computing system, the first plurality of combined data records and the second plurality of combined data records in the data repository of the provider computing system;
receiving, by the provider computing system, a query;
executing, by the provider computing system, the query on the data repository to select at least one combined data record of the first plurality of combined data records and at least one combined data record of the second plurality of combined data records;

generating, by the provider computing system, an electronic file including the selected combined data records; and outputting, by the provider computing system, the electronic file.

12. The method of claim 11, wherein the plurality of data records further comprises at least a fifth data record, and wherein cleaning the plurality of data records comprises:

determining, by the provider computing system, the fifth data record substantially matches the first data record; and removing, by the provider computing system, the fifth data record without removing the first data record record to generate a cleaned first data record.

13. The method of claim 11, wherein the plurality of data records each include a state key, and wherein cleaning the plurality of data records comprises:

determining, by the provider computing system, a state term for each state key of each data record; and replacing, by the provider computing system, the state key of each data record with the determined state term.

14. The method of claim 11, wherein generating the at least one first attribute based on one or more of the cleaned data records of the first group comprises:

determining, by the provider computing system, a disposition of each cleaned data record of the first group; and generating, by the provider computing system, a disposition attribute for each cleaned data record of the first group based on the determined disposition of each cleaned data record.

15. The method of claim 14, wherein the provider computing system determines at least one disposition is an interim disposition and at least one disposition is a final disposition indicating the cleaned data record including the final disposition was generated after the cleaned data record including the interim disposition, and wherein the provider computing system generates at least one interim disposition attribute and at least one final disposition attribute.

16. The method of claim 11, wherein at least one of the cleaned data records of the first group includes a rejection code, and wherein generating the at least one first attribute based on one or more of the cleaned data records of the first group comprises:

determining, by the provider computing system, a classification for each of the rejection codes of the cleaned data records of the first group; and generating, by the provider computing system, a classification attribute for each cleaned data record of the first group that includes a rejection code based on the determined classification.

17. The method of claim 11, wherein each data record of the plurality of data records includes a medical product code, a date, and a health care provider (HCP) identifier, and wherein assigning at least the first cleaned data record and the second cleaned data record data to the first group comprises:

combining, by the provider computing system, the medical product code, the date, and the HCP identifier of the cleaned first data record to generate a first intermediate group identifier;

generating, by the provider computing system, a group identifier based on the first intermediate group identifier by performing a hashing algorithm on the first intermediate group identifier;

assigning, by the provider computing system, the cleaned first data record to the first group by adding the group identifier to the cleaned first data record;

combining, by the provider computing system, the medical product code, the date, the HCP identifier, and the deidentified identifier of the cleaned second data record to generate a second intermediate group identifier;

generating, by the provider computing system, the group identifier based on the second intermediate group identifier by performing a hashing algorithm on the second intermediate group identifier; and assigning, by the provider computing system, the cleaned second data record to the first group by adding the group identifier to the cleaned second data record.

18. The method of claim 11, wherein the query includes a configuration property, and wherein the provider computing system executes the query on the data repository to select at least one combined data record of the first plurality of combined data records and at least one combined data record of the second plurality of combined data records which match the configuration property of the query.

19. The method of claim 18, wherein the configuration property is at least one of: a medical product code, a timeframe, the at least one attribute, a procedure code, a location, a health care provider (HCP) specialty, an age, or a gender.

20. The method of claim 11, wherein the plurality of data records is a first plurality of data records, wherein the one or more covered entity computing systems comprise a first covered entity computing system associated with a pharmacy and a second covered entity computing system associated with a medical claims company, and wherein the method further comprises:

receiving, by the provider computing system, the first plurality of data records from the first covered entity computing system, wherein each data record of the first plurality of data records comprises prescription claim (Rx) data including deidentified protected health information (PHI);

receiving, by the provider computing system, a second plurality of data records from the second covered entity computing system, wherein each data record of the second plurality of data records comprises medical claim (Mx) data including deidentified protected health information (PHI);

cleaning, by the provider computing system, the second plurality of data records;

assigning, by the provider computing system, at least two of the cleaned data records of the second plurality of data records to a third group;

generating, by the provider computing system, at least one third attribute based on the cleaned data records of the third group;

adding, by the provider computing system, the at least one third attribute to the cleaned data records of the third group to generate a third plurality of combined data records; and storing, by the provider computing system, the third plurality of combined data records in the data repository of the provider computing system.

* * * * *